(12) United States Patent
Aikoh et al.

(10) Patent No.: US 9,047,195 B2
(45) Date of Patent: Jun. 2, 2015

(54) COMPUTER SYSTEM WITH VIRTUALIZATION MECHANISM AND MANAGEMENT TABLE, CACHE CONTROL METHOD AND COMPUTER PROGRAM

(75) Inventors: Kazuhide Aikoh, Yokohama (JP); Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 13/522,669

(22) PCT Filed: Jul. 5, 2012

(86) PCT No.: PCT/JP2012/004360
§ 371 (c)(1),
(2), (4) Date: Jul. 17, 2012

(87) PCT Pub. No.: WO2014/006656
PCT Pub. Date: Jan. 9, 2014

(65) Prior Publication Data
US 2014/0012936 A1    Jan. 9, 2014

(51) Int. Cl.
*G06F 15/167* (2006.01)
*G06F 12/08* (2006.01)
(Continued)

(52) U.S. Cl.
CPC ........ *G06F 12/0811* (2013.01); *G06F 9/45558* (2013.01); *H04L 67/1002* (2013.01); *G06F 12/0817* (2013.01); *G06F 12/084* (2013.01); *G06F 12/0871* (2013.01); *G06F 2212/1044* (2013.01); *G06F 2212/1048* (2013.01)

(58) Field of Classification Search
CPC ........................ G06F 9/45558; H04L 67/1002

USPC .......................................... 709/213, 215, 216
See application file for complete search history.

(56) References Cited

U.S. PATENT DOCUMENTS 7,437,511 B1    10/2008  Nguyen et al.
2001/0032299 A1  10/2001  Teramoto
(Continued)

FOREIGN PATENT DOCUMENTS

EP    1 755 042 A2    2/2007
JP    06-266683       9/1994
JP    2003-150445     5/2003

OTHER PUBLICATIONS

International Search Report and Written Opinion in PCT/JP2012/004360 dated Mar. 11, 2013.
(Continued)

*Primary Examiner* — Hitesh Patel
(74) *Attorney, Agent, or Firm* — Foley & Lardner LLP

(57) ABSTRACT

At least one of a first application program and a second application program sends an access request to a second cache management module, which receives the access request, and references the second cache management table to identify the storage location of the access-target data conforming to the access request. When access-target data exists in first cache area, the second cache management module sends a request to the first cache management module storing the access-target data, and where access-target data does not exist in the first cache area, acquires the access-target data from the second storage device. When the access-target data is in first cache area, the first cache management module acquires the access-target data conforming to the request from the relevant first cache area, and sends access-target data to the second cache management module.

8 Claims, 19 Drawing Sheets

(51) Int. Cl.
*G06F 9/455* (2006.01)
*H04L 29/08* (2006.01)

(56) References Cited

U.S. PATENT DOCUMENTS

2009/0113420 A1    4/2009  Pawlowski
2010/0036889 A1*   2/2010  Joshi et al. .................... 707/200
2010/0241673 A1*   9/2010  Wu et al. ....................... 707/812
2011/0145505 A1*   6/2011  Anand et al. ................... 711/130
2012/0059796 A1*   3/2012  Neumann et al. ............. 707/638

OTHER PUBLICATIONS

Tarjan, D. et al. "The Sharing Tracker: Using Ideas from Cache Coherence Hardware to Reduce Off-Chip Memory Traffic with Non-Coherent Caches", High Performance Computing, Networking, Storage and Analysis, pp. 1-10, Nov. 13, 2010, XP031807825.

* cited by examiner

FIG. 6

| Capacity (GB) 21211 | Usage (GB) 21212 | Physical address 21213 | 2121 |
|---|---|---|---|
| 32 | 10 | 0 | |
| | | 1 | |
| | | 2 | |

FIG. 7

| Page number 21221 | Physical address 21222 | Data 21223 | Valid bit 21224 | 2122 |
|---|---|---|---|---|
| 0 | 3 | a | Valid | |
| 2 | 2 | b | Invalid | |

FIG. 8

| Node identifier (31211) | Communication mode (31212) | Capacity (GB) (31213) | Usage (GB) (31214) |
|---|---|---|---|
| 0 | Memory reference | 64 | 50 |
|  |  | 64 | 30 |
| A | RDMA | 32 | 10 |
| B | RDMA | 32 | 20 |
| C | RDMA | 32 | 10 |

| Page number (31221) | Virtual address (31222) | Valid bit (31223) |
|---|---|---|
| 0 | 3 | Valid |
| 1 | - | Invalid |
| 2 | 5 | Invalid |
| 3 | 2 | Valid |
| 4 | - | Valid |

| Virtual address (31231) | Attribute value (31232) | Physical location (31233) | Physical address (31234) | Utilization status (31235) |
|---|---|---|---|---|
| 0 | Extension | Local memory | 0 | Used |
| 1 | Extension | Local memory | 1 | Unused |
| 2 | Shared | Local memory | 2 | Used |
| 3 | Virtual A | Computation node A | 0 | Used |
| 4 | Virtual A | Computation node A | 1 | Unused |
| 5 | Virtual B | Computation node B | 0 | Used |
| 6 | Virtual B | Computation node B | 1 | Unused |
| 7 | Virtual C | Computation node C | 0 | Unused |
| 8 | Virtual C | Computation node C | 1 | Unused |

3123

COMPUTER SYSTEM WITH VIRTUALIZATION MECHANISM AND MANAGEMENT TABLE, CACHE CONTROL METHOD AND COMPUTER PROGRAM

TECHNICAL FIELD

The present invention relates to cache control.

BACKGROUND ART

For the purpose of utilizing the big data, attention to the high-speed analysis technology of big data is increasing. An IT platform capable of accessing large amounts of data at high speeds is needed to realize this high-speed analysis technology.

To meet this requirement, for example, Patent Literature 1 discloses a parallel processor having multiple processors, a distributed shared memory (cache memory) provided for each processor, and an information transfer line therebetween. Specifically, each processor is able to store data, which is being held in a distributed shared memory of another processor, in its own distributed shared memory as needed. That is, each processor disclosed in Patent Literature 1 is able to share data with another processor using the distributed shared memory. Thus, the entire parallel processor is able to access large amounts of data at high speeds without increasing the capacity of the distributed shared memory.

However, in a case where the capacity of the distributed shared memory is large enough to be able to store all the data targeted by an application pursuant to processing large amounts of data, the distributed shared memory, although fast, becomes very expensive. For this reason, it is conceivable that an I/O (Input/Output) node, which comprises a nonvolatile storage device and a cache memory for temporarily storing data to be input/output to/from this storage device, be coupled to a processor (computation node) comprising a cache memory, frequently used data be stored in the cache area of the processor, and infrequently used data be stored in the I/O node storage device.

For example, Patent Literature 2 discloses a technology for hierarchizing a storage area, which includes the computation node cache memory, the I/O node cache memory, and the I/O node storage device, linking this hierarchized storage area to the processing of an application, and arranging data required by the application in a storage area belonging to a prescribed tier.

CITATION LIST

Patent Literature

PTL 1: Japanese Patent Application Laid-open No. H06-266683
PTL 2: Japanese Patent Application Laid-open No. 2003-150445

SUMMARY OF INVENTION

Technical Problem

However, in Patent Literature 2, the management of the cache memory in the computation node and the management of the cache memory in the I/O node are independent of one another. The management of a cache memory is optimized for the node (the I/O node or the computation node) comprising the cache memory. Therefore, cache memory utilization efficiency deteriorates in a computer system, which comprises multiple computation nodes and I/O nodes (I/O nodes, which are examples of computers) coupled thereto. For example, the same data could remain in both the computation node cache memory and the I/O node cache memory, or infrequently used data could be left in the cache memory.

Solution to Problem

There are multiple first computers, and a second computer, which comprises a second storage device. Each of the multiple first computers comprises a first application program, a first cache management module, and a first cache area. The second computer comprises a virtualization mechanism, and multiple OSs run on the virtualization mechanism. The multiple OSs comprise an OS on which a second application program runs, and at least one OS comprising a second cache management module and a second cache management table. The first application program and/or the second application program send(s) an access request to the second cache management module. The second cache management module receives the access request from the first application program and/or the second application program, and references the second cache management table to identify the storage location of the access-target data conforming to the access request. In a case where the access-target data exists in the first cache area, the second cache management module sends a data transfer request to the first cache management module storing the access-target data, and in a case where the access-target data does not exist in the first cache area, acquires the access-target data from the second storage device. In the case where the access-target data exists in the first cache area, the first cache management module acquires the access-target data conforming to the data transfer request from the relevant first cache area, and sends the access-target data to the second cache management module. The second cache management module sends the acquired access-target data or the received access target data to the first application program and/or the second application program.

BRIEF DESCRIPTION OF DRAWINGS

FIG. 6 shows an example of a configuration management table 2121 of the computation node 2.
FIG. 7 shows an example of a cache management table 2122 of the computation node 2.
FIG. 8 shows an example of a configuration management table 3121 of the I/O node 3.
FIG. 9 shows an example of a cache management table 3122 of the I/O node 3.
FIG. 10 shows an example of an address management table 3133 of the I/O node 3.

DESCRIPTION OF EMBODIMENTS

A number of examples will be explained.

In the following explanation, various types of information may be explained using the expression "xxx table", but the various information may also be expressed using a data structure other than a table. To show that the various information is not dependent on the data structure, "xxx table" can be called "xxx information".

Furthermore, in the following explanation, there may be cases where processing is explained having a computer program as the doer of the action, but since stipulated processing is performed in accordance with a program being executed by a controller-equipped processor (for example, a CPU (Central Processing Unit)) while using a storage resource (for example, a memory) and a communication control device (for example, a communication port) as needed, the processor may also be regarded as the doer of the processing. A process, which is explained having the program as the doer of the action, may be regarded as a process performed by a controller, which comprises the processor executing this program, or an apparatus comprising this controller (for example, a computation node or an I/O node). Furthermore, either part or all of a program may be realized using dedicated hardware. The controller may comprise the dedicated hardware in addition to a processor. A computer program may be installed in respective computers from a program source. The program source, for example, may be either a program delivery server or a storage medium.

In the following explanation, in a case where like elements "ttt" are explained by distinguishing therebetween, these like elements may be expressed by combining reference signs like "tttA" and "tttB", but when no particular distinction is made between these elements, the elements are described simply as "ttt".

EXAMPLE 1

Figure 1:
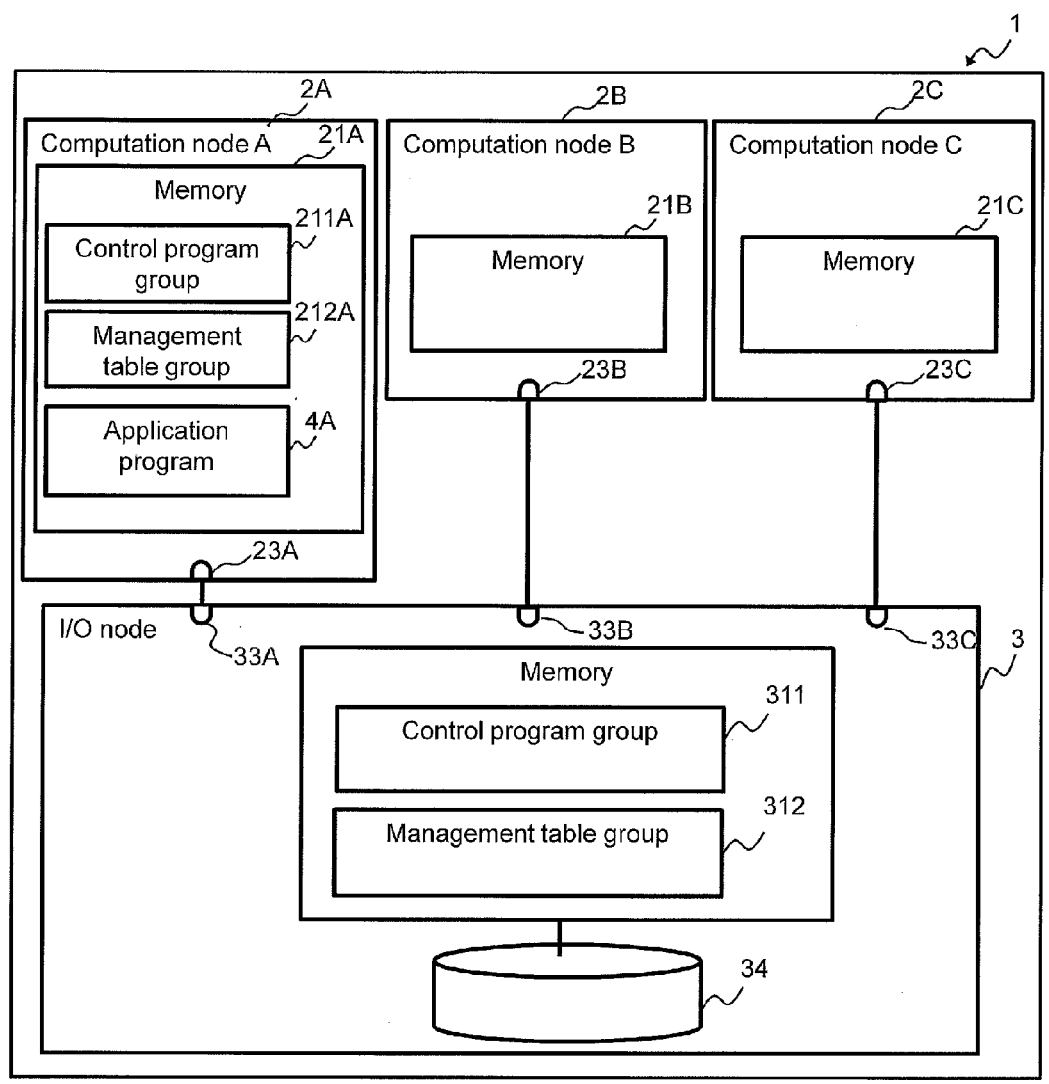
FIG. 1 is a block diagram showing an example of the entire configuration of a computer system related to Example 1.

FIG. 1 is a block diagram showing an example of the entire configuration of a computer system 1 related to Example 1.

A computer system 1 comprises a computation node 2 and an I/O node 3, and these components (the computation node 2 and the I/O node 3) are installed in the same enclosure. The computation node 2 and the I/O node 3 are coupled inside the enclosure using a prescribed interface (for example, a PCI (Peripheral Components Interconnect bus)) 23, 33. The computation node 2, for example, is a host computer. The I/O node 3, for example, is a storage apparatus to which the host computer is coupled.

The computation node 2 and the I/O node 3 do not have to be disposed in the same enclosure. The computation node 2 and the I/O node 3 may also be coupled via a prescribed communication network (for example, a SAN (Storage Area Network)).

The computation node 2, for example, is a type of computer. The computation node 2 stores a control program group 211, a management table group 212, and an application program 4 in a memory 21. The application program 4 is software, which has been designed for a certain purpose (for example, software for enabling a computer to function as a word processor). The control program group 211 and the management table group 212 will be explained further below.

The I/O node 3, for example, is a type of input/output device, and specifically, as was explained hereinabove, is a storage apparatus. The I/O node 3 comprises a nonvolatile storage device 34 and a memory 31, and stores a control program group 211 and a management table group 212 in the memory 31.

Figure 2:
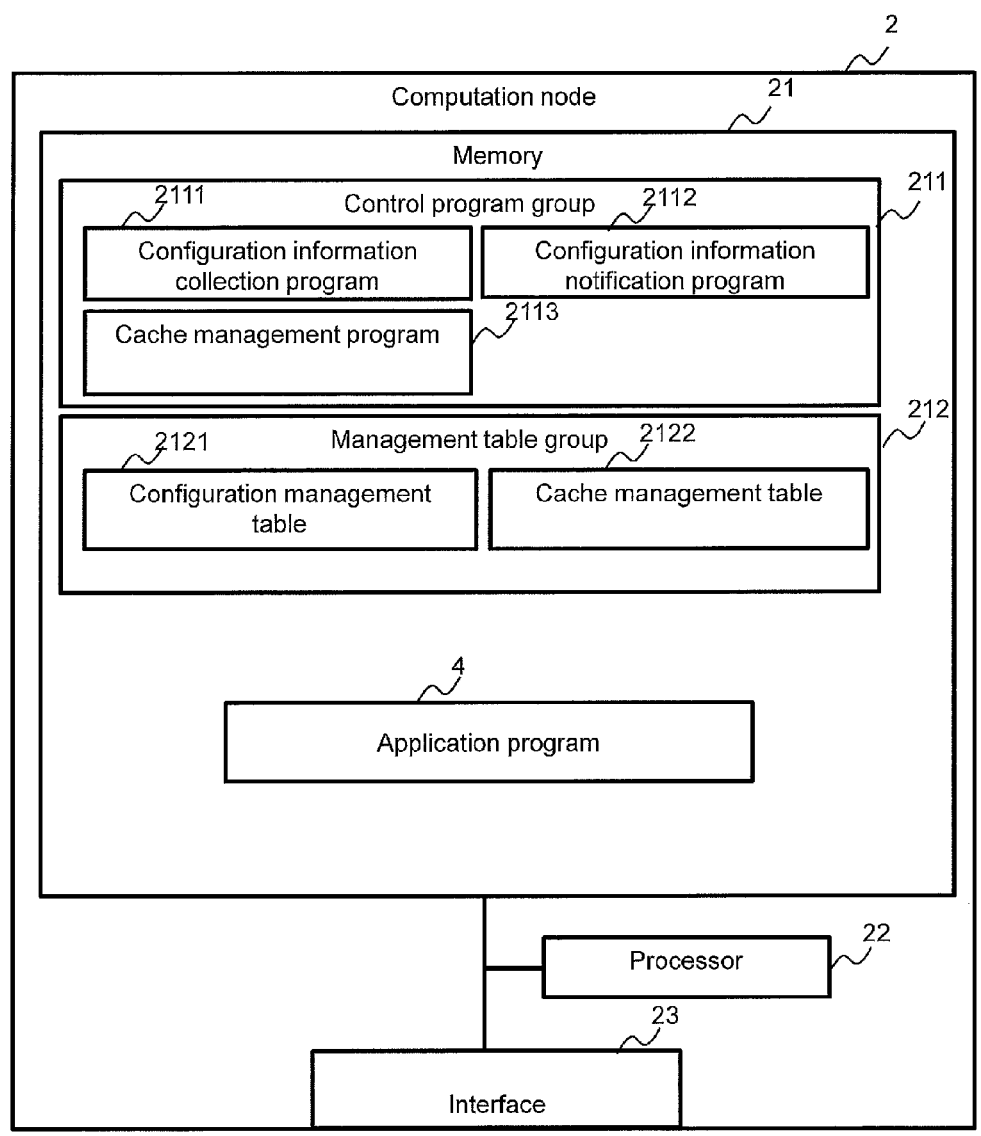
FIG. 2 is a block diagram showing an example of the configuration of a computation node 2.

FIG. 2 is a block diagram showing an example of the configuration of the computation node 2.

The computation node 2 comprises a memory 21, an interface 23, and a processor (for example, a CPU (Central Processing Unit)) 22 coupled thereto.

The processor 22 is responsible for controlling the operation of the computation node 2, and executes the necessary processing based on the control program group 211 and management table group 212 stored in the memory 21. The memory 21, in addition to being used to store the control program group 211 and the management table group 212, is also used as working memory for the processor 22. The interface 23 is a communication interface, and controls the protocol when the computation node 2 communicates with the I/O node 3.

The control program group 211 comprises a configuration information collection program 2111, a configuration information notification program 2112, and a cache management program 2113. The programs 2111 through 2113 in the drawing may be realized using a single program, or may be divided into either two or less, or four or more programs depending on the implementation.

The configuration information collection program 2111, for example, operates as an interface for configuring a configuration management table 2121, which will be explained further below. The configuration information collection program 2111, for example, configures and/or updates the configuration management table 2121 by invoking a setting API (Application Program Interface).

The configuration information notification program 2112 notifies the I/O node 3 of information being held in the configuration management table 2121 and information being stored in a cache management table 2122, which will be explained further below, when a not-shown OS (Operating System) of the computation node 2 is booted up, and in accordance with a request from a configuration information collection program 3111 and a shared cache management program 3112 of the I/O node 3, which will be explained further below.

The cache management program 2113 stores data from the I/O node 3 (the memory 31 or the storage device 34) in a local cache area 215, and updates the data stored in the local cache area 215 in accordance with a request from the application program 4. Specifically, for example, the cache management program 2113 adds an entry to a cache management table 2122 and updates the entry.

The management table group 212 comprises the configuration management table 2121 and the cache management table 2122. These management tables 2121 and 2122 will be explained further below.

Figure 3:
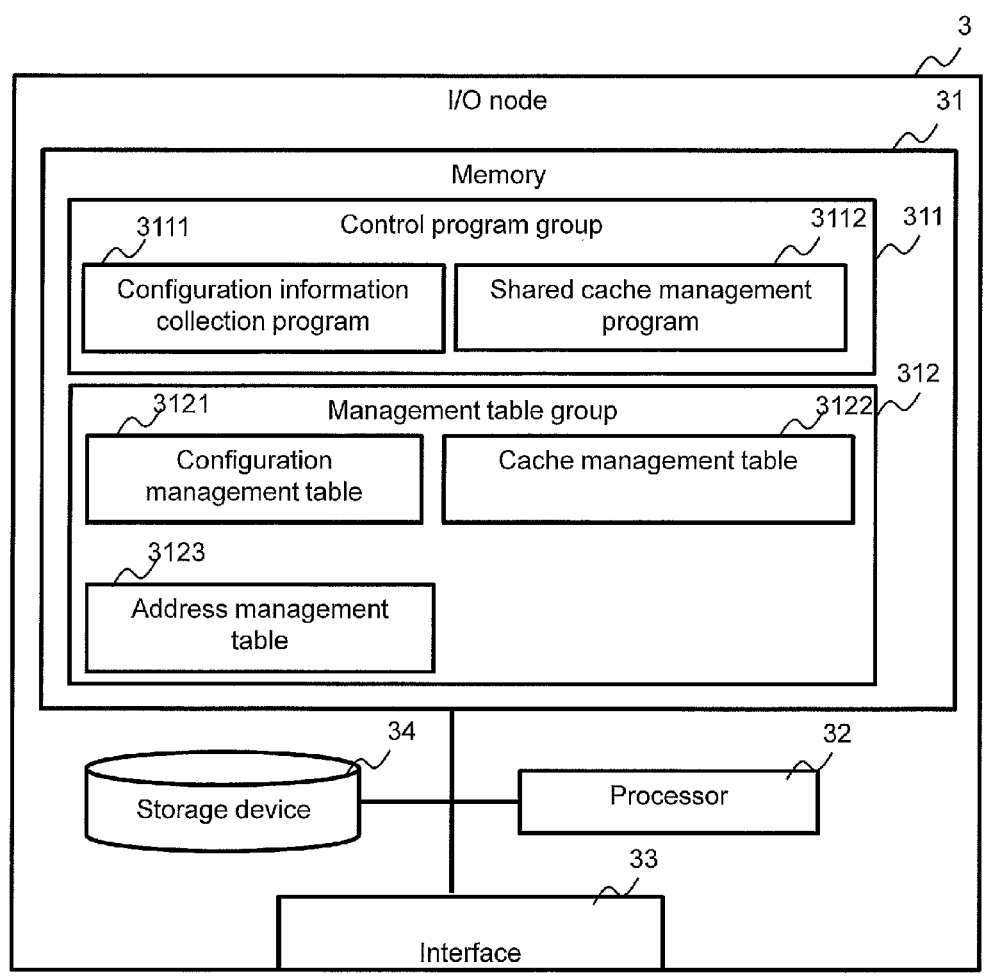
FIG. 3 is a block diagram showing an example of the configuration of an I/O node 3.

FIG. 3 is a block diagram showing an example of the configuration of the I/O node 3.

As shown in FIG. 3, the I/O node 3 comprises a memory 31, a processor 32, an interface 33, and a storage device 34.

The memory 31, processor 32 and interface 33 respectively comprise substantially the same functions as the memory 21, processor 22, and interface 33 of the computation node 2, and as such, detailed explanations thereof will be omitted.

The storage device 34, for example, may by multiple physical storage devices configured as a RAID (Redundant Array of Inexpensive Disks), or may be a logical storage device based on either an internal or external physical storage device. For example, data, which is used by the computation node 2 application program 4, is stored in the storage device 34, and this data is stored in the memory 21 and used when needed by the application program 4.

The control program group 311 stored in the memory 31 includes a configuration information collection program 3111 and a shared cache management program 3112. The programs 3111 and 3112 may be realized by being consolidated into a single program, or may be divided into three or more programs depending on the implementation.

The configuration information collection program 3111 updates a configuration management table 3121 and an address management table 3123 in accordance with a request from the information notification part 2112 of the computation node 2.

The shared cache management program 3112, in accordance with a request from the cache management program 2113 of the computation node 2, acquires data from the storage device 34, reads/writes the data from/to the cache area of the memory 31, and updates a shared cache management table 3122, which will be explained further below.

The management table group 312 stored in the memory 31 comprises a configuration management table 3121, a cache management table 3122, and an address management table 3123. These tables 3121 through 3123 will be explained further below.

Figure 4:
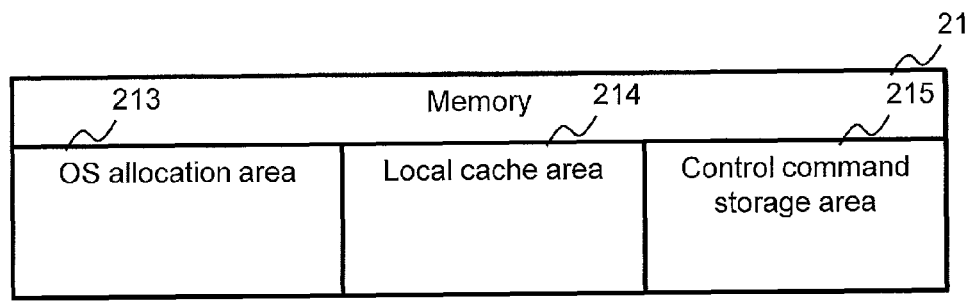
FIG. 4 is a schematic diagram for illustrating an example of a method for using a memory 21 of the computation node 2.

FIG. 4 is a schematic diagram for illustrating a method for using the memory 21 of the computation node 2.

The computation node 2 allocates and uses the storage area of the memory 21 with respect to the above-mentioned management table group 212 and the respective programs (4, 211), and, in addition, logically partitions and uses the memory 21 storage area as an OS allocation area 213, a local cache area 214, and a control command storage area 215.

The OS allocation area 213 is an area used as a working area by the OS, the application program 4, and the control program groups 211. The local cache area 214 is used as a cache area by the control program group 211. The control command storage area 215 is for storing the contents of a processing request (command) from the local cache area 214 and the I/O node 3.

Figure 5:
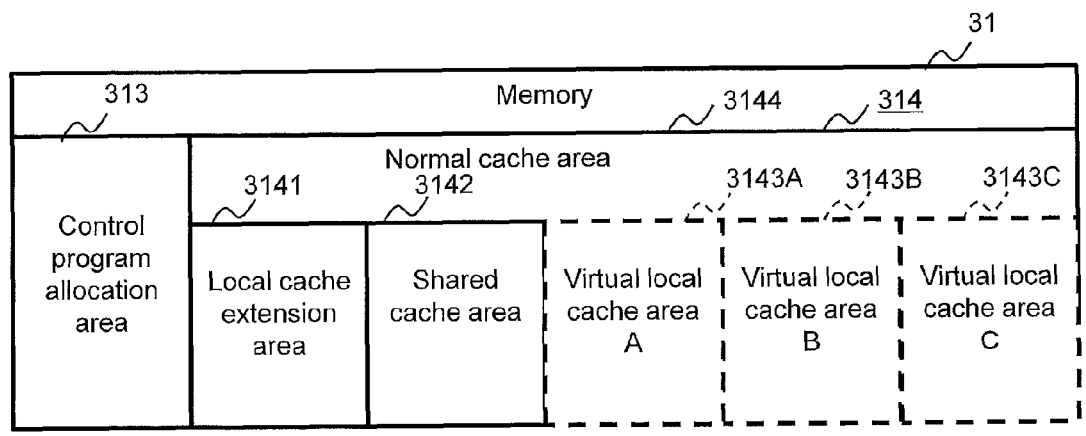
FIG. 5 is a schematic diagram for illustrating an example of a method for using a memory 31 of the I/O node 3.

FIG. 5 is a schematic diagram for illustrating a method for using the memory 31 of the I/O node 3.

The I/O node 3 allocates the storage area of the memory 31 to the above-mentioned management table group 312 and the control program group 311, and, in addition, allocates the memory 31 storage area to a control program allocation area 313 and a cache area 314, and logically partitions and uses the control program allocation area 313 and the cache area 314.

Of these, the I/O node 3 logically partitions and manages the cache area 314 as a normal cache area 3144, a local extended cache area 3141, and a shared cache area 3142, and, in addition, manages multiple virtual local cache areas 3143 respectively corresponding to the multiple local cache areas 214.

The normal cache area 3144 is for temporarily storing data inputted/outputted to/from the storage device 34.

The local extended cache area 3141 stores data from the computation node 2 local cache area 214. The shard cache area 3142 stores data, which is referenced by multiple computation nodes 2.

The virtual local cache area 3143 is associated with the local cache areas 214 of the respective computation nodes 2. That is, the virtual local cache area 3143 exists in proportion to the number of computation nodes 2 communicating with the I/O node 3. For example, the drawing shows a case in which the I/O node 3 is communicating with three computation nodes 2A through 2C, and virtual local cache areas 3143A through 3143C, which respectively correspond to local cache areas 214A through 214C of the respective computation nodes 2A through 2C, exist in the memory 31. A single virtual local cache area 3143A will be given as an example of the virtual local cache area as deemed appropriate hereinbelow.

The I/O node 3 associates the addresses (physical addresses, which will be explained further below) of the local cache areas 214A through 214C of the computation nodes 2A through 2C with the address (virtual addresses, which will be explained further below) of the corresponding virtual local cache areas 3143A through 3143C, and, in addition, manages the utilization statuses of the local cache areas 214A through 214C. This makes it possible for the I/O node 3 to integratively manage the computation node 2 local cache areas 214A through 214C and the I/O node 3 cache area 314.

The virtual local cache area 3143A is associated with the local cache area 214A, but does not actually store data (for example, data used by the application program 4). The data in the virtual local cache area 3143A is actually stored in the corresponding local cache area 214A. The I/O node 3 can access data in the corresponding local cache area 214A by referencing the virtual local cache area 3143A. The virtual local cache area 3143A does not store the same data as the data stored in the local cache area 214A, thereby making it possible to conserve the capacity of the I/O node 3 cache area 314.

There is one local extended cache area 3141, and this local extended cache area 3141 is logically partitioned, and a partitioned area is provided to each computation node 2. This approach promises to keep the capacity of the local extended cache area 3141 small. However, a local extended cache area 3141 may also be provided to each computation node 2.

FIG. 6 shows an example of the configuration management table 2121 of the computation node 2.

The configuration management table 2121 comprises a capacity 21211, a used capacity 21212, and a physical address 21213. The capacity 21211 shows the capacity of the local cache area 214. The used capacity 21212 shows the amount of data actually used by the computation node 2 with respect to the capacity of the local cache area 214. The physical address 21213 shows multiple physical addresses belonging to the local cache area 214.

FIG. 7 shows an example of the cache management table 2122 of the computation node 2.

The cache management table 2122 comprises a page number 21221, a physical address 21222, a data 21223, and a valid bit 21224.

The storage device 34 comprises multiple pages (storage areas), and the page number 21221 is the number of a page of the storage device 34. The physical address 21222 is the same as the physical address 21213 of the configuration management table 2121, that is, it shows the physical address of the local cache area 214. Based on a combination of the page number 21221 and the physical address 21222, it is clear where data, which is stored in a certain page of the storage device 34, is stored in the local cache area 214. The data 21223 shows the type of data being stored in an area (an area in the local cache area 214) identified from the physical address 21222.

The valid bit 21224 is information showing whether the data stored in the area identified using the physical address 21222 is "valid" or "invalid". "Invalid" shows that the data stored in the area identified in accordance with the physical address 21222 is different from data stored in a page of the storage device 34 associated with the relevant area. Alternatively, "valid" shows that the data stored in the area identified using the physical address 21222 is the same as data stored in the page associated with the relevant area.

FIG. 8 shows an example of the configuration management table 3121 of the I/O node 3.

The configuration management table 3121 correspondingly manages a node identifier 31211, a communication mode 31212, a capacity 31213, and a used capacity 31214 for each computation node 2 or I/O node 3.

The node identifier 31211 is information for identifying the computation nodes 2A through 2C and the I/O node 3. The node identifier "0" denotes the I/O node 3. The node identifiers "A through C" respectively denote the computation nodes 2A through 2C.

The communication mode 31212 shows the mode by which the I/O node 3 accesses data, which is associated with the cache area 314, and data, which is stored in the cache area 314. The modes for accessing data, for example, are RDMA (Remote Direct Memory Access), and memory reference. "RDMA" shows that the I/O node 3 accesses data stored in the local cache area 214, which is associated with a virtual local cache area 3143. "Memory reference" shows that the I/O node 3 accesses data stored in the local extended cache area 3141 and the shared cache area 3142, which are areas of the cache area 314 other than the virtual local cache area 3143.

The capacity 31213 shows the capacity of both the local extended cache area 3141 and the shared cache area 3142 in a case where the node identifier 31211 is "0". In a case where the node identifier 31211 is "A through C", the capacity 31213 shows the capacity of each of the local cache areas 214A through 214C.

The used capacity 31214 shows the capacity, which is actually being used with respect to the capacity 31213.

In a case where the node identifier 31211 is "0", the capacity 31213 and the used capacity 31214 are divided into two rows. The upper row shows the capacity 31213 and the used capacity 31214 of the local extended cache area 3141, and the lower row shows the capacity 31213 and the used capacity 31214 of the shared cache area 3142. In addition, in a case where the node identifier 31211 is "A through C", the capacity 31213 and used capacity 31214 of the virtual local cache area 3143 corresponding to the local cache areas 214A through 214C of the respective computation nodes 2A through 2C are shown.

FIG. 9 shows an example of the cache management table 3122 of the I/O node 3.

The cache management table 3122 shows whether or not data stored in the cache area 314 and data stored in the storage device 34 are redundant.

The cache management table 3122 comprises a page number 31221, a virtual address 31222, and a valid bit 31223.

The page number 31221 is a number of a page in the storage device 34. The virtual address 31222 shows multiple virtual addresses, which belong to the cache area 314. For example, in the example shown in the drawing, the page number 31221 "0" is associated with the virtual address "3", and this shows that data stored in the page of the page number "0" is stored in the area (the area in the cache area 314) belonging to virtual address "3". Meanwhile, an invalid value "-" is associated as the virtual address 31222 with the page number 31221 "1". This shows that data stored in the storage device 34 is not stored in the cache area 314.

The valid bit 31223 is information showing whether data stored in the storage device 34 is "valid" or "invalid". The valid bit 31223 is substantially the same as the valid bit 21224 of the cache management table 2122. For example, in the drawing, the page number "2" of the storage device 34 is associated with the virtual address "5" of the cache area 314, but the valid bit 31223 is "invalid", thereby indicating that the data stored in the area (the area in the cache area 314) of the virtual address "5" differs from the data being stored in the page of page number "2".

FIG. 10 shows an example of the address management table 3133 of the I/O node 3.

The address management table 3123 comprises a virtual address 31231, an attribute value 31232, a physical location 31233, a physical address 31234, and a utilization status 31235 for each area in the cache area 314. The information of the address management table 3123 will be explained below by taking one area in the cache area 314 (referred to as "target area" in the explanation of FIG. 10) as an example.

The virtual address 31231 shows the virtual address of the target area.

The attribute value 31232 shows the type of area, which comprises the target area. The attribute value 31232 "extended" shows that the target area is being used as the local extended cache area 3141. The attribute value 31232 "shared" shows that the target area is being used as the shared cache area 3142. Also, the attribute value 31233 "virtual A" shows that the target area is being used as the virtual local cache area 3143A. This attribute value 31232 may be omitted.

The physical location 31233 shows the place where the data stored in the target area is actually stored. "Local memory" shows that the data stored in the target area is actually being stored in the memory 31 of the I/O node 3. In addition, "Computation node A" shows that the data stored in the target area is actually being stored in the memory 21 of the computation node 2A.

The physical address 31234 shows the physical address of the target area. The utilization status 31235 shows whether data is being stored in the area indicated by the physical address 31234 of the target area. "Used" shows that data is being stored in the area indicated by the physical address 31234 of the target area. "Unused" shows that data is not being stored in the area indicated by the physical address 31234 of the target area.

How data is migrated between caches will be explained next.

Figure 22:
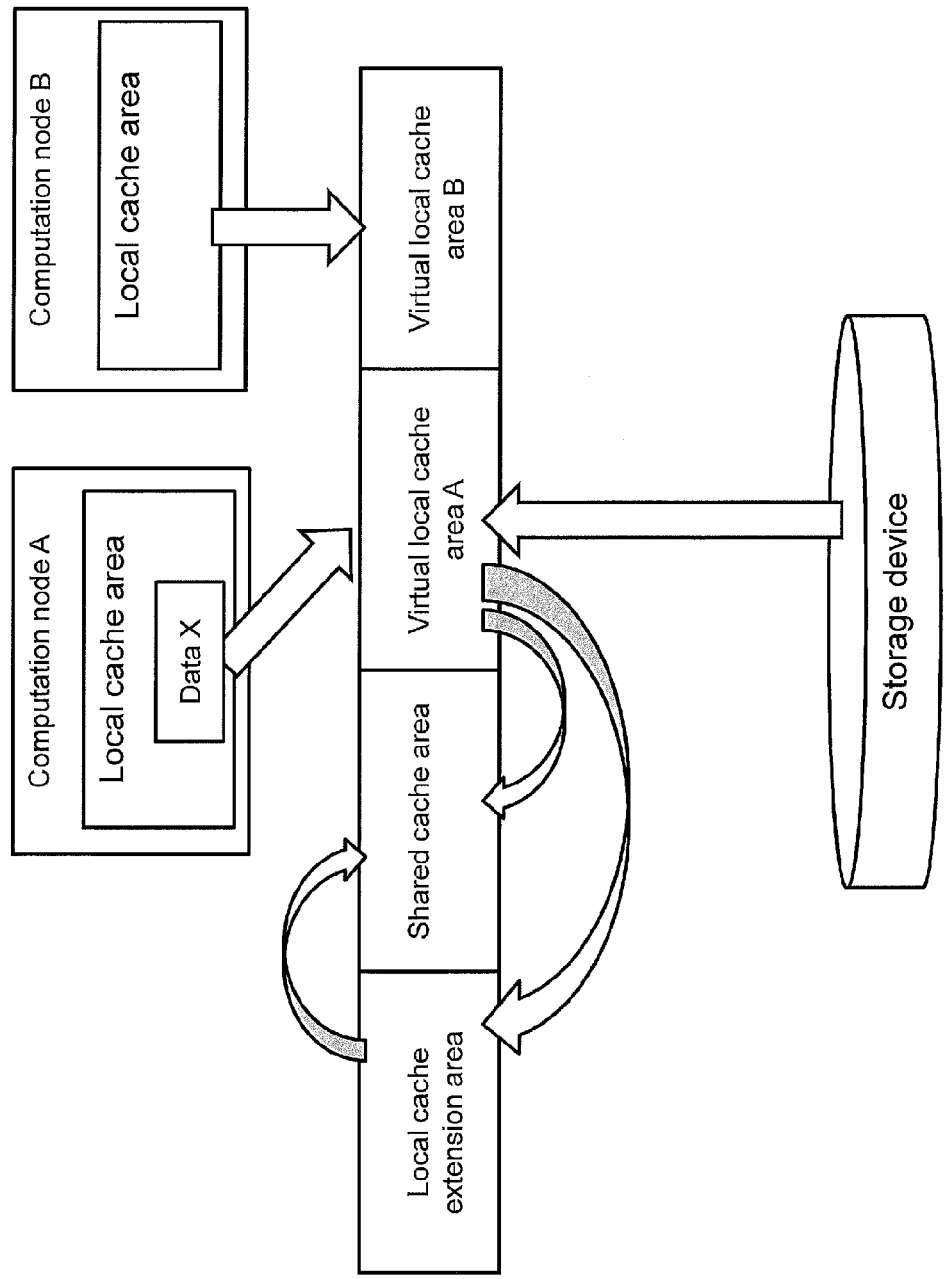
FIG. 22 is a schematic diagram for illustrating the migration of data between caches.

FIG. 22 is a schematic diagram for illustrating the migration of data between caches. Furthermore, in the explanation of FIG. 22, it is supposed that the computer system 1 is as described in (1) through (5) below.

(1) The local cache area of the computation node A is an area for storing data acquired at the time of an application program A (the application program of the computation node A) read request. The same also holds true for the local cache area of the computation node B, which is used at the time of an application program B (the application program of the computation node B) read request.

(2) The virtual local cache areas A and B are area names, which appear in the cache management table 3122 of the I/O node 3 for determining whether or not the I/O node 3 writes data to the local cache areas of computation nodes A and B, and are not for using the I/O node 3 memory area to actually store data. In a case where the I/O node 3 decides to read/write data from/to the virtual local cache area A (B), the I/O node 3 issues a read/write request to the local cache area A (B) of the computation node A (B).

(3) The local extended cache area is for use as a migration destination for data prior to an overwrite when a data overwrite has been generated in the local cache area A (B) of the computation node A (B).

(4) The shared cache area 3142 is for storing data, which has been referenced by both application programs A and B, and migrates data with respect to a read request from the application program A (B) in a case where a hit occurred for either the computation node B (A) local cache area B (A) or the local extended cache area.

(5) Both of the application programs A and B can use the data in the local cache areas of the computation nodes A and B, and in the I/O node memory by going through the I/O node.

<Data Migration Process (1)>

A process for migrating data from the local cache area A (virtual local cache area A) to the shared cache area will be explained here.

In a case where there has been a read request from the application program A to read data X from a page of the storage device 34, the computation node A sends the read request to the I/O node 3 without determining whether or not the data X is in the local cache area A. The I/O node 3 reads the data X from the storage device 34 to the normal cache area 3144, and sends the read data X to the computation node 2A, which is the source of the read request. The computation node 2A stores the received data X in the local cache area A.

Then, in a case where there is a data X read request from the application program B, the computation node B sends this read request to the I/O node 3 without determining whether or not the data X is in the local cache area B. The I/O node 3 receives the read request, reads data X from the local cache area A corresponding to the virtual local cache area A, which corresponds to the source of the read request, stores the read data X in the normal cache area 3144, and sends the data X from the normal cache area 3144 to the computation node B. The computation node B stores the received data X in the local cache area A. Thereafter, the I/O node 3 migrates the data X stored in the normal cache area 3144 (the above-mentioned data X, which has been stored in the normal cache area 3144 from the local cache area A) from the normal cache area 3144 to the shared cache area 3142. That is, in a case where the application B once again targets data X for a read, the data X will generate a hit in the shared cache area 3142 even, for example, when the data X has been overwritten and has disappeared from the local cache area B. In a case where the I/O node 3 has received a read request from the computation node B targeting the data X for a read, this makes it possible to rapidly send the data X without placing a load on the computation node A, and, in addition, without relying on the cache update frequency of the application A.

<Data Migration Process (2)>

A process for migrating data from the local cache area A (virtual local cache area A) to the extended local cache area will be explained here.

The I/O node 3 checks the remaining capacity (or, the free area ratio, which is the percentage of remaining capacity relative to the capacity of the local cache area A) of the local cache area A of the computation node A at cache update time. Then, in a case where the remaining capacity of the computation node A local cache area A is equal to or smaller than the size of the update data, the I/O node 3 migrates, from among data stored in the local cache area A, the data, which corresponds to a prescribed condition (for example, infrequently used data) X, to the local extended cache area.

Thus, there may be cases where storing the data, which conforms to a prescribed condition (for example, infrequently used data) X, in the local extended cache area A temporarily rather than suddenly swapping this data out of the storage device 34 makes it possible to reduce the frequency with which the data X must be read from the storage device 34. Furthermore, the data X, which has been stored in the local extended cache area A, is migrated to the shared cache area 3142 when targeted for a read by the computation node B.

<Data Migration Process (3)>

A process for migrating data from the local extended cache area to the shared cache area 3142 will be explained here.

In a case where there is a read request for the data X from the application program B after data migration process (2) has been performed, the computation node B sends the read request to the I/O node 3. The I/O node 3 receives this read request, stores the data X, which is being stored in the local extended cache area, in the normal cache area 3144 for a time, and sends the data X from the normal cache area 3144 to the computation node B. The computation node B stores the received data X in the local cache area B. Thereafter, the I/O node 3 migrates the data X from the normal cache area 3144 to the shared cache area 3142.

The flow of processing of each program will be explained next.

Figure 11:
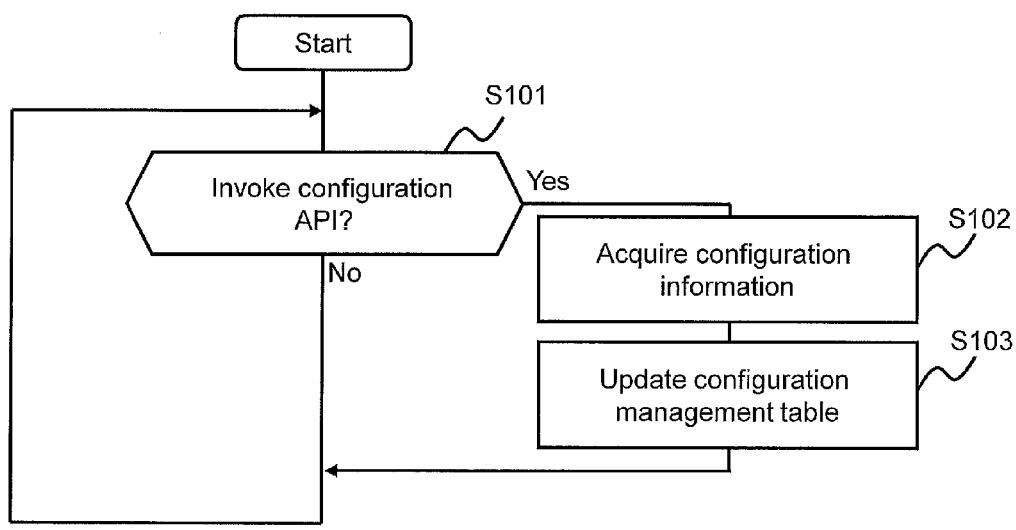
FIG. 11 is an example of a flowchart of the processing of a configuration information collection program 2111 of the computation node 2.

FIG. 11 is an example of a flowchart of the processing of the configuration information collection program 2111 of the computation node 2.

The configuration information collection program 2111 detects the execution of a setting API from the application program 4 (S101).

In a case where the execution of the setting API has not been detected (S101: No), the configuration information collection program 2111 performs the processing of S101.

In a case where the configuration information collection program 2111 has detected the execution of the setting API (S101: Yes), the configuration information collection program 2111 uses the setting API to collect the configuration information to be notified (S102), and writes the collected configuration information to the configuration management table 2121 (S103).

The configuration management table 2121 is either created or updated in accordance therewith.

Figure 12:
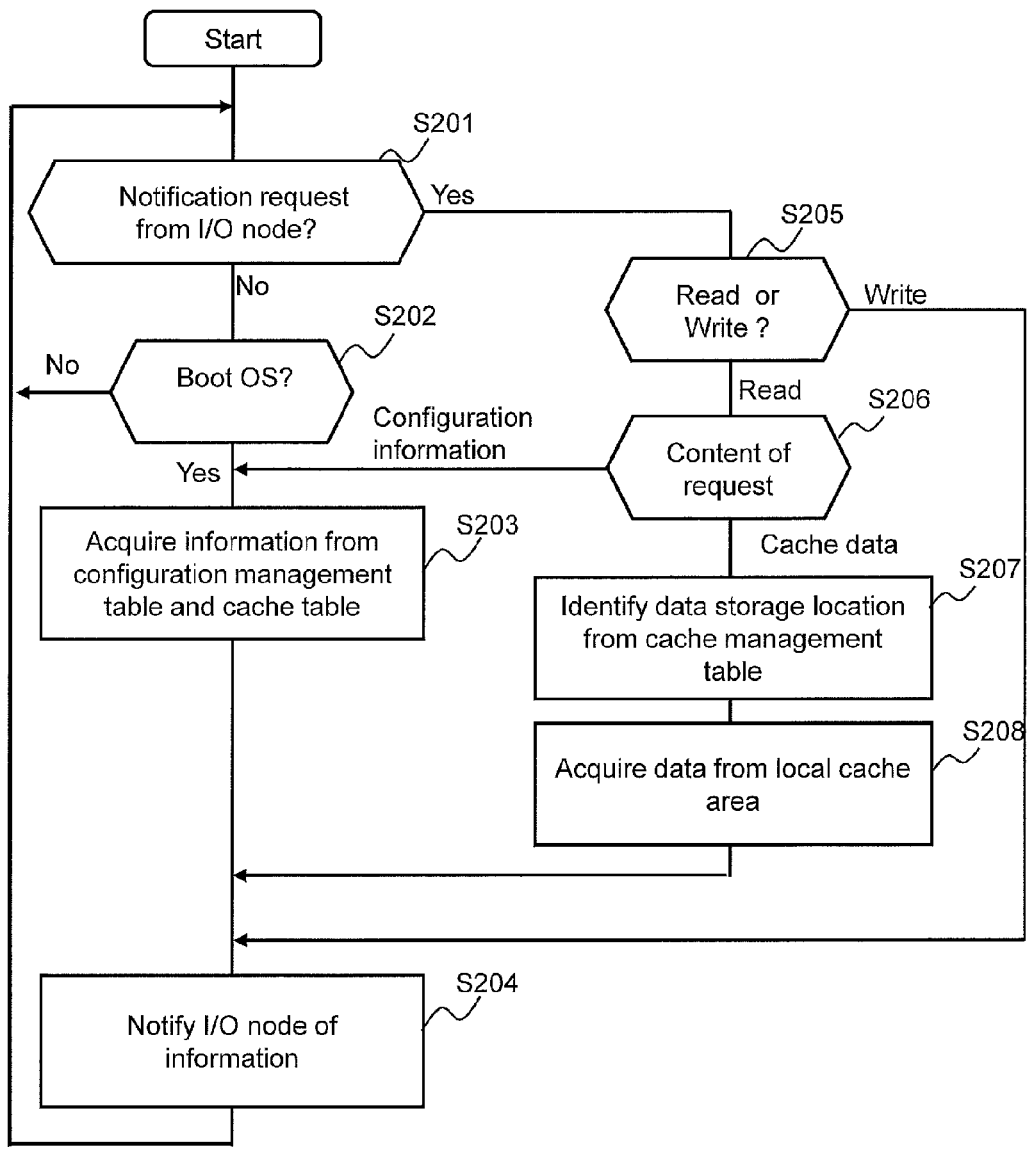
FIG. 12 is an example of a flowchart of the processing of an information notification program 2112 of the computation node 2.

FIG. 12 is an example of a flowchart of the processing of the information notification program 2112 of the computation node 2.

The information notification program 2112 determines whether or not there has been a configuration information acquisition request from the I/O node 3 (S201). As used here, the configuration information is information, which is managed by the configuration management table 2121 and the cache management table 2122 of the computation node 2.

In a case where a configuration information acquisition request from the I/O node 3 has not been detected (S201: No), the information notification program 2112 checks whether or not a computation node 2 OS boot-up process has been executed (S202).

In a case where the execution of the OS boot-up process has not been detected (S202: No), the information notification program 2112 returns to the processing of S201.

In a case where the execution of the OS boot-up process has been detected (S202: Yes), the information notification program 2112 collects information related to the local cache area 214 from the configuration management table 2121 and the cache management table 2122 (S203), and sends the collected information to the I/O node 3 as configuration information (S204). Thereafter, the information notification program 2112 once again performs the processing of S201.

In a case where a configuration information acquisition request from the I/O node 3 has been detected (S201: Yes), the information notification program 2112 determines the type of the request (read or write) from the I/O node 3 (S205).

In a case where the determination of S205 is that the request is a read request, the information notification program 2112 performs the processing of S206. In a case where the request is a write request, the information notification program 2112 performs the processing of S204.

In a case where the determination of S206 is that the read request is a request to acquire configuration information, the information notification program 2112 performs the processing of S203.

In a case where the determination of S206 is that the read request is a request to acquire cache data (the data in the local cache area 214), a physical address will be specified in this read request. The configuration information notification program 2112 uses the physical address of the read request to reference the cache management table 2122, identifies the storage location of the read-target data (S207), and acquires the read-target data from the identified storage location (an area in the local cache area 214) (S208). Thereafter, the information notification program 2112 performs the processing of S204.

Figure 13:
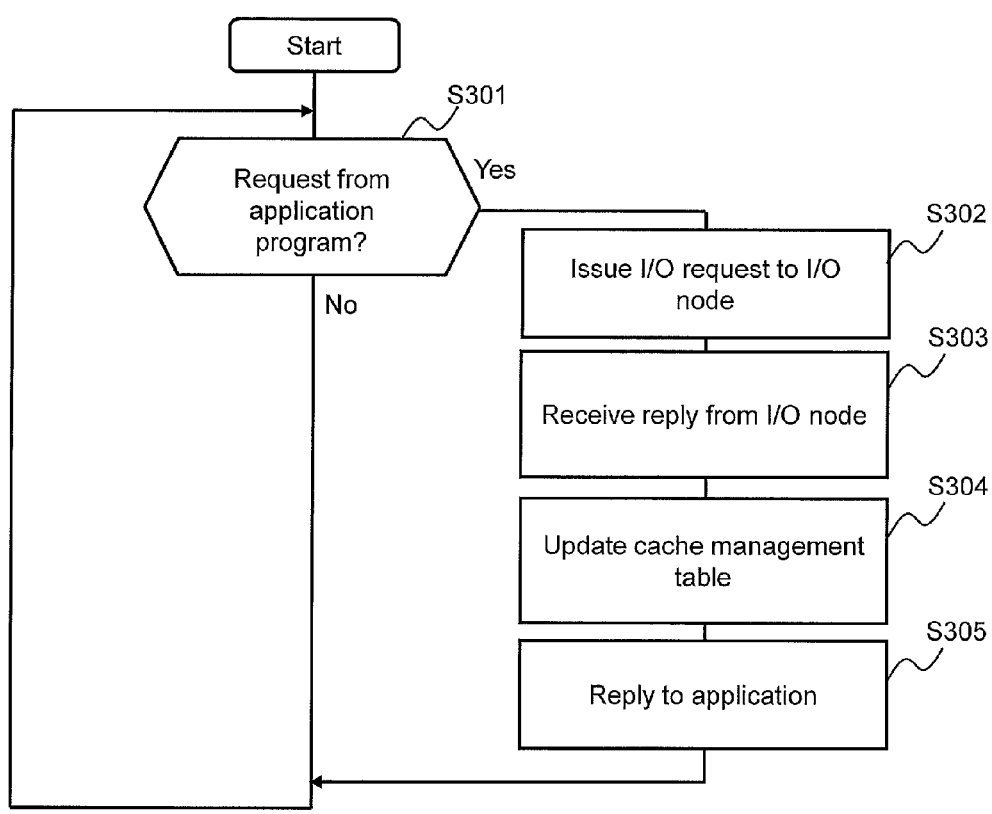
FIG. 13 is an example of a flowchart of the processing of a cache management program 2113 of the computation node 2.

FIG. 13 is an example of a flowchart of the processing of the cache management program 2113 of the computation node 2.

The cache management program 2113 checks whether or not an I/O request has been generated in accordance with a certain computer program (assumed to be the application program 4 in the explanation of FIG. 13) being executed (S301).

In a case where there is no I/O request from the application program 4 (S301: No), the cache management program 2113 performs the processing of S301.

In a case where there is an I/O request from the application program 4 (S301: Yes), the cache management program 2113 sends the I/O request from the application program 4 to the I/O node 3 without determining whether or not data conforming to this I/O request is in the local cache area 214 (S302).

The cache management program 2113 receives a reply (hereinafter referred to as I/O reply) with respect to the I/O request from the I/O node 3 (S303). Specifically, for example, the cache management program 2113, in accordance with the I/O reply from the I/O node 3, stores the data conforming to the I/O request in the area (the area in the local cache area 214) belonging to the physical address specified in the I/O reply.

The cache management program 2113 updates the cache management table 2122. For example, the cache management program 2113 adds an entry conforming to the I/O request to the cache management table 2122, stores a page number, a physical address, and data included in the received reply in the added entry, and, in addition, configures the valid bit 21223 in this entry to "valid". The cache management program 2113 updates the value of the used capacity 21212 of the configuration management table 2121 to the value specified in the I/O reply from the I/O node 3 (S304).

The cache management program 2113 replies to the application program 4 that the I/O processing has been completed (S305).

Figure 14:
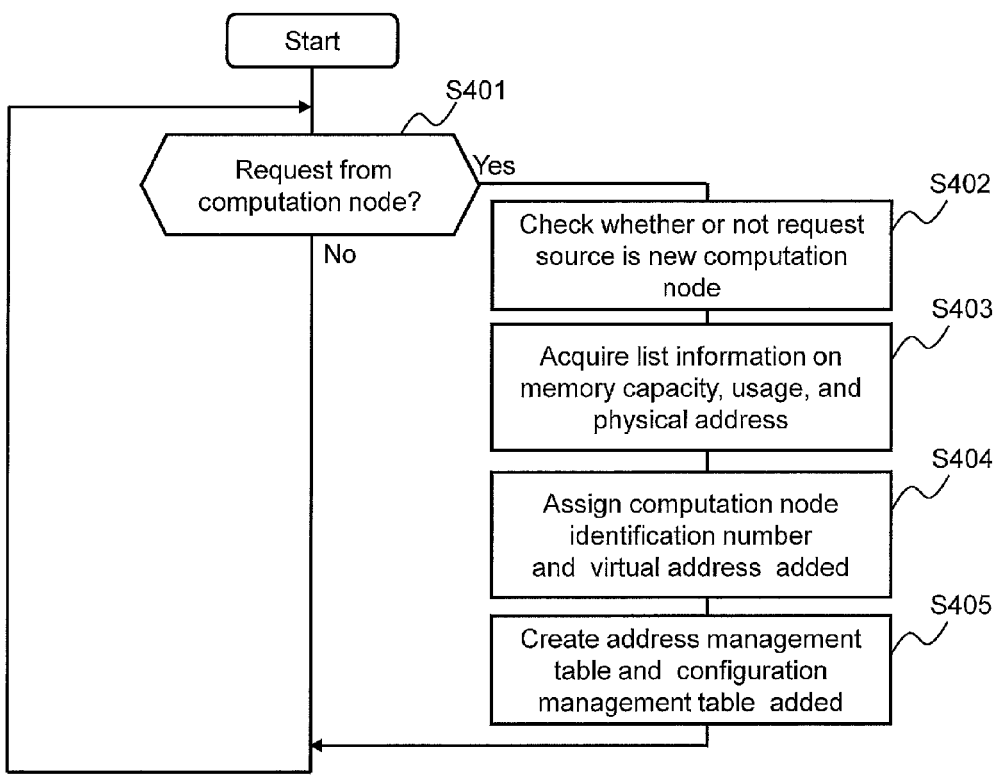
FIG. 14 is an example of a flowchart of the processing of a configuration information collection program 3111 of the I/O node 3.

FIG. 14 is an example of a flowchart of the processing of the configuration information collection program 3111 of the I/O node 3.

The I/O node 3 determines whether or not there is a configuration information notification request from the computation node 2 (S401).

In a case where there is no configuration information notification request from the computation node 2 (S401: No), the configuration information collection program 3111 performs the processing of S401.

In a case where there is a configuration information notification request from the computation node 2 (S401: Yes), the configuration information collection program 3111 determines whether or not the notification request-source computation node 2 is a new computation node 2 (S402). A new computation node 2 is a computation node, which is not registered in the address management table 3123. Specifically, for example, the configuration information collection program 3111 identifies a PCI pin number from which the communication was generated, and determines whether the identified computation node 2 is a new computation node 2 by determining whether or not the identified computation node 2 is registered in the address management table 3123.

The configuration information collection program 3111 stores information conforming to the configuration information notification request in the memory 31 of the I/O node 3 as the configuration information, and/or updates the memory 31 with the information conforming to the configuration information notification request (S403).

The configuration information collection program 3111, in a case where the computation node 2 is a new computation node 2, for example, configures the PCI pin number as the identification number of this computation node 2, and based on the capacity of the usable cache memory 21 (local cache memory 214) of this computation node 2, allocates a virtual address 3143, which is an area constituting a portion of the cache area 314, to the cache memory 21 (S404).

The configuration information collection program 3111 stores configuration information related to the computation node 2 registered in the address management table 3123 and/or configuration information related to the new computation node 2 in the cache management table 3122 and the address management table 3123 (S405). Thereafter, the configuration information collection program 3111 performs the processing of S401 once again.

According to the processing shown in FIG. 14, the I/O node 3 is able to integratively manage the information being managed by the computation node 2 configuration management table 2121 and the cache management table 2122 of each computation node 2.

Figure 15:
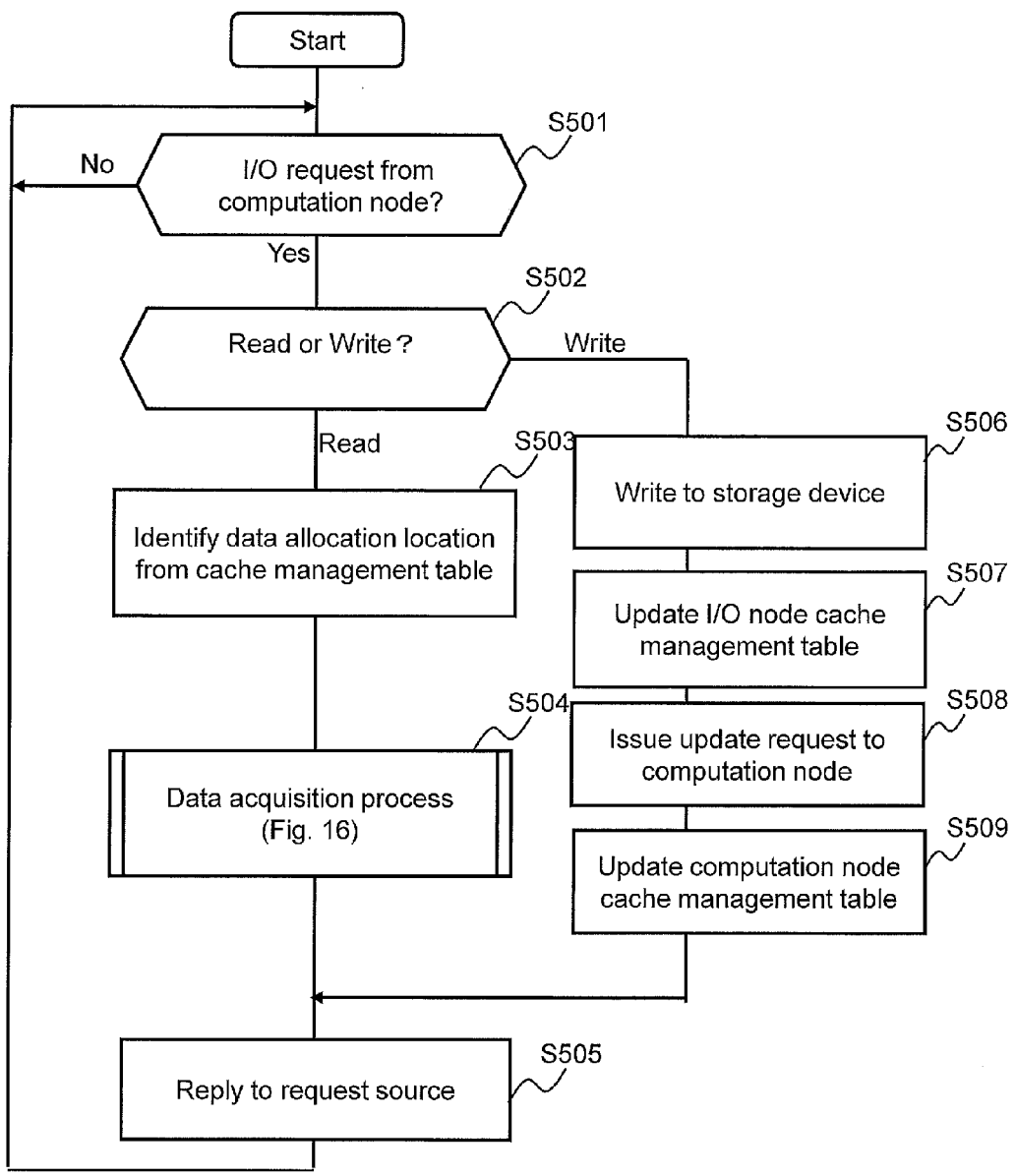
FIG. 15 is a detailed example of S503 of FIG. 15.

FIG. 15 is an example of a flowchart of the processing of the shared cache management program 3112 of the I/O node 3.

The shared cache management program 3112 determines whether or not there is an I/O request from the computation node 2 (S501).

In a case where there is no I/O request from the computation node 2 (S501: No), the shared cache management program 3112 once again performs the processing of S501.

In a case where there is an I/O request from the computation node 2 (S501: Yes), the shared cache management program 3112 determines whether the I/O request is a read request or a write request (S502).

In a case where the I/O request is a read request, the shared cache management program 3112 identifies the storage location of data conforming to the read request from the cache management table 3122 (S503). The data storage location here shows the page number 31221 of the storage device 34. Initially, the data conforming to the read request is not stored in any of the local cache areas 214 associated with the local extended cache area 3141, shared cache area 3142, and virtual local cache area 3143.

The shared cache management program 3112 reads the data from the read-source page (the page to which the read request-specified address belongs) of the storage device 34 in which the data conforming to the read request is stored, and stores the read data in the normal cache area 3144 (S504).

The shared cache management program 3112 sends a reply (response) including this data to the request-source (the source of the read request) computation node 2 (S505).

Alternatively, in a case where the I/O request is a write request, the shared cache management program 3112 writes the data conforming to the write request (the write-target data) to the write-destination page (the page to which the write request-specified address belongs) of the storage device 34 (S506). The shared cache management program 3112 does not write the write-target data to the normal cache area 3144 at this point, but may temporarily store this data in the normal cache area 3144, and thereafter write this data to the write-destination page from the normal cache area 3144.

The shared cache management program 3112 configures the valid bit 31223 corresponding to the write-destination page to "invalid" in the cache management table 3122 (S507). This process, for example, is for prohibiting the application program 4 from using pre-update data stored in the cache areas 214 and 314. Processing such as this is performed because data read to the cache areas 214 and 314 from the storage device 34 prior to updating will differ from the post-update data stored in the storage device 34 as a result of data stored in the storage device 34 having been updated.

The shared cache management program 3112 references the address management table 3123, and sends a cache management table 2122 update request to the computation node 2 corresponding to the virtual address for which the valid bit 31223 was configured to "invalid" in S507 (S508). This update request specifies the physical address corresponding to the virtual address for which the valid bit 31223 was configured to "invalid" in S507.

The computation node 2, which is the destination of the update request of S508, receives this update request, and configures the valid bit 21223 corresponding to the physical address specified in this update request to "invalid" in the cache management table 2122 (S509). Thereafter, the shared cache management program 3112 once again performs the processing of S505.

Figure 16:
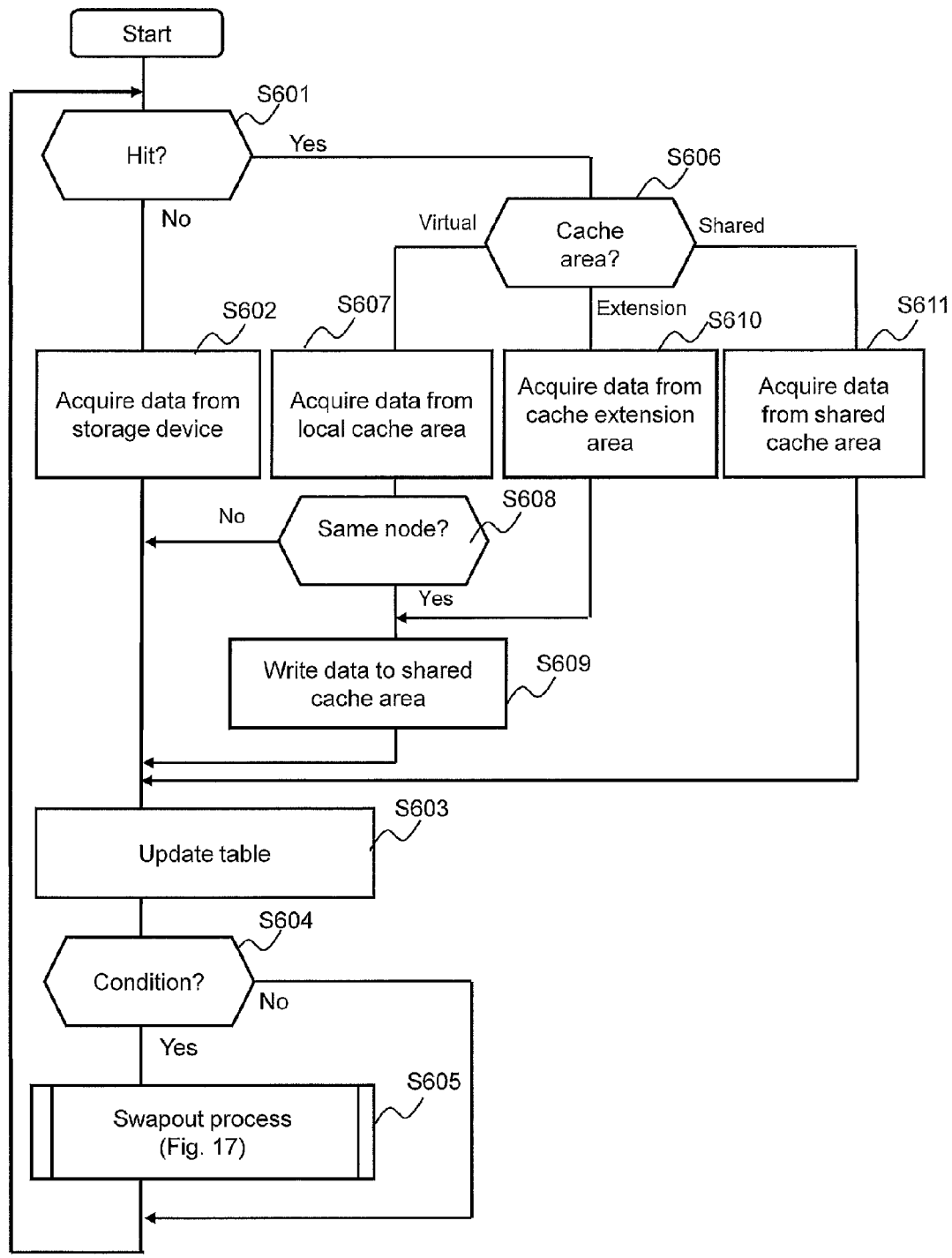
FIG. 16 is a detailed example of data acquisition processing (S504 of FIG. 15).

FIG. 16 is a detailed example data acquisition processing (S504 of FIG. 15).

The shared cache management program 3112 references the cache management table 3122 and determines whether or not there is a cache hit (S601). The "presence or absence of a cache hit" here refers to whether or not the read-target data is stored in the virtual local cache area corresponding to the computation node, which is the source of the read request, and specifically to whether or not the association between the read-source page number 31221 and virtual address 31222 exists in the cache management table 3122.

In a case where there is no cache hit (S601: No), the shared cache management program 3112 reads the read-target data from the read-source page (the storage device 34) (S602), stores the read data in the normal cache area 3144, includes this data in a reply to the request-source computation node 2, and, in addition, configures the valid bit 31223 corresponding to the read-source page to "valid" in the cache management table 3122 (S603).

Thereafter, the shared cache management program 3112 determines whether or not a prescribed condition regarding the virtual local cache area 3143 corresponding to the request-source computation node 2 has been satisfied (S604). Specifically, for example, the shared cache management program 3112 determines whether or not the free space (or the free capacity ratio) for the virtual local cache area 3143 (the local cache area 214) corresponding to the request-source computation node 2 is equal to or smaller than a prescribed value. This determination can be made by referencing the configuration management table 3121.

In a case where the prescribed condition for the virtual local cache area 3143 corresponding to the request-source computation node 2 has been satisfied (S604: Yes), the shared cache management program 3112 executes a swap-out process (S605). As used here, "swap-out process", for example, refers to moving infrequently used data from among the data stored in the virtual local cache area 3143 (local cache area 214) to the storage device 34. This swap-out process increases the remaining capacity of the virtual local cache area 3143 (local cache area 214).

In a case where there has been a cache hit (S601: Yes), the shared cache management program 3112 references the address management table 3123 and determines in which area of the cache area 314 (that is, which of the local extended cache area 3141, the shared cache area 3142, and the virtual local cache area 3143) the cache hit data is located (the area storing the read-target data) (S606).

In a case where the determination of S606 is that the cache hit data location is the virtual local cache area 3143, the shared cache management program 3112 uses, for example, a RDMA transfer process to acquire the read-target data from the local cache area 214, which is associated with the virtual local cache area 3143 (S607), and determines whether or not the data request-source computation node and the data acquisition-destination computation node are the same (S608). This determination processing is implemented by comparing the node identifiers 31211 in the configuration management table 3121.

In a case where the determination of S608 is that it is not the same node (S608: No), the shared cache management program 3112 performs the processing of S603.

In a case where the determination of S608 is that it is the same node (S608: Yes), the shared cache management program 3112 writes the acquired data to the shared cache area 3142 (S609). Thereafter, the shared cache management program 3112 performs the processing of S603.

In a case where the determination of S606 is that the cache hit location is the local extended cache area 3141, the shared cache management program 3112 acquires the read-target data from the local extended cache area 3141 (S610), and write this data to the shared cache area 3142 (S609). Thereafter, the shared cache management program 3112 performs the processing of S603.

In a case where the determination of S606 is that the cache hit location is the shared cache area 3142, the shared cache management program 3112 acquires the read-target data from the shared cache area 3142 (S611). Thereafter, the shared cache management program 3112 performs the processing of S603.

The determination as to whether or not there is a cache hit may be performed in order from the shared cache area, the virtual local cache area, and the local extended cache area. Specifically, for example, the shared cache management program 3112 may perform the cache hit determination for the shared cache area, and in a case where the result of this determination is negative, may perform the cache hit determination for the virtual local cache area, and in a case where the result of this determination is negative, may perform the cache hit determination for the local extended cache area. The reason the initial target of the cache hit determination is the shared cache area is because the preferential use of data, which has been stored in the shared cache area, avoids the frequently accesses to the computation node 2, thereby making it possible to hold the performance degradation of the application program 4 in check.

In addition, the shared cache management program 3112 of the I/O node 3 may comprise a setting API for controlling the order of cache hit determinations, and may change the determination order in accordance with a specification from the application program 4.

Figure 17:
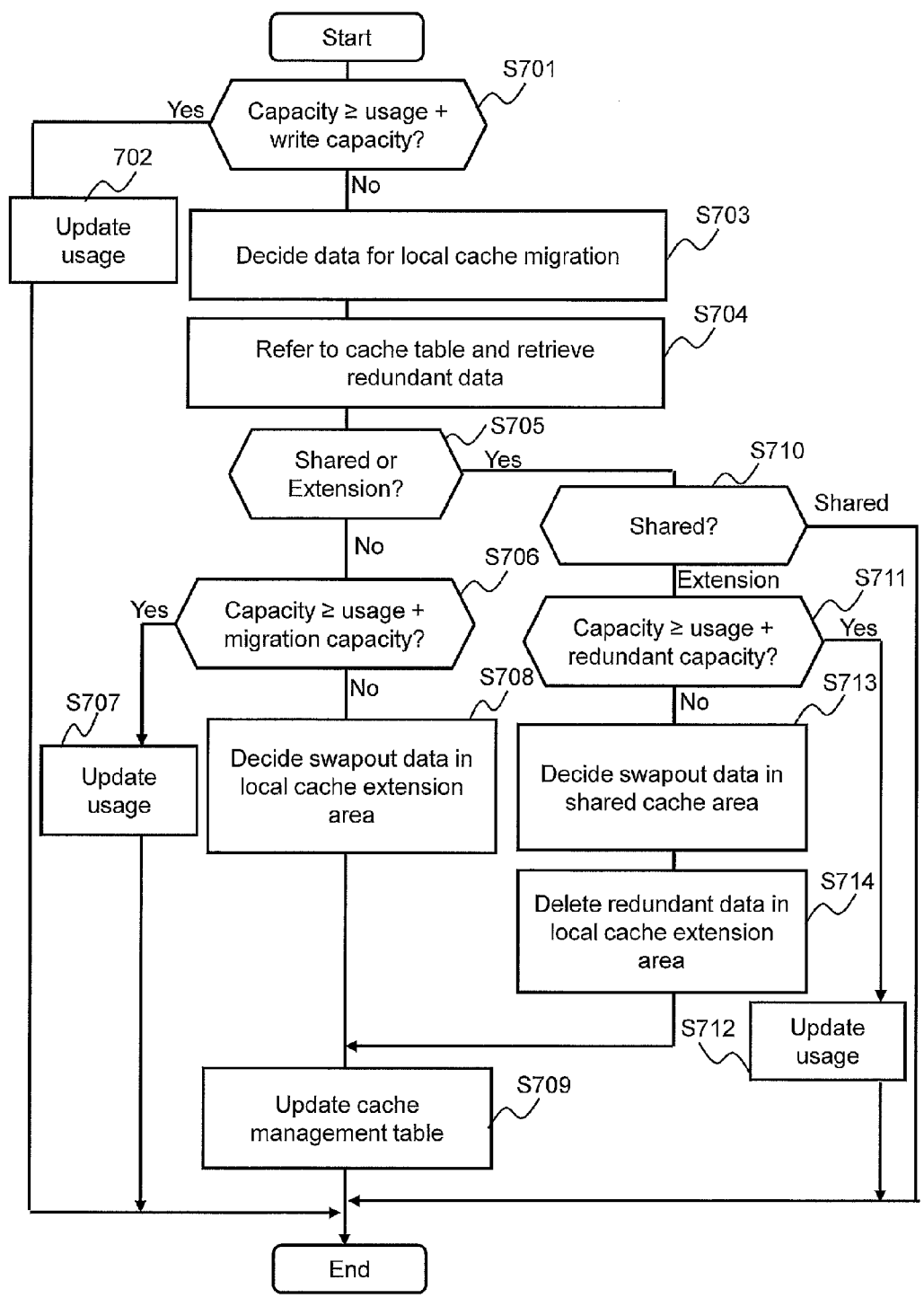
FIG. 17 is a detailed example of swap-out processing (S604 of FIG. 16).

FIG. 17 is a detailed example of swap-out processing (S604 of FIG. 16).

The swap-out process, for example, is performed based on the amount of remaining capacity of the local cache area 214 associated with the virtual local cache area 3143. Specifically, for example, the shared cache management program 3112 references the configuration management table 3121 and determines whether or not the capacity 31213 of the request-source computation node 2 is equal to or larger than the sum of the used capacity 31214 and the write capacity (the size of the write-target data) (S701).

In a case where the capacity 31213 is equal to or larger than the sum of the used capacity 31214 and the write capacity (S701: Yes), the shared cache management program 3112 writes the write-target data to the local cache area 214 associated with the virtual local cache area 3143, and adds the value of the write capacity to the used capacity 31214 of the request-source computation node 2 (S702).

Alternatively, in a case where the capacity 31213 is less than the sum of the used capacity 31214 and the write capacity (S701: No), the shared cache management program 3112 decides migration-target data from among the data stored in the local cache area 214 of the request-source computation node 2 based, for example, on a LRU (Least Recently Used) algorithm (S703). The shared cache management program 3112 reads the migration-target data from the local cache area 214 and temporarily stores this migration-target data in the normal cache area 3144.

The shared cache management program 3112, based on the cache management table 3122 and the address management table 3123, uses the page number corresponding to the migration-target data to retrieve the migration-target data and redundant data (matching data) from the local extended cache area 3141 and the shared cache area 3142 (S704).

In a case where the redundant data is not being stored in either of the local extended cache area 3141 or the shared cache area 3142 (S705: No), the shared cache management program 3112 references the configuration management table 3121 (the capacity 31213 of the node having the node identifier 31211 of "0"), and determines whether or not the capacity 31213 of the local extended cache area 3141 is equal to or larger than the sum of the used capacity 31214 and the migration capacity (the size of the migration-target data) (S706).

In a case where the capacity 31213 is equal to or larger than the sum of the used capacity 31214 and the migration capacity (S706: Yes), the shared cache management program 3112 writes the migration-target data to a free area in the local extended cache area, and adds the migration capacity to the used capacity 31214 of the local extended cache area in the configuration management table 3121 (S707).

Alternatively, in a case where the capacity 31213 is less than the sum of the used capacity 31214 and the migration capacity (S706: No), the shared cache management program 3112 decides the data to be swapped out from among the data stored in the local extended cache area 3141 (for example, makes a decision based on the LRU algorithm), swaps out the decided data from the local extended cache area 3141 to the storage device 34, and writes the migration-target data to the free area of the local extended cache area 3141 (the area in which the swapped out data had been stored) (S708). In addition, the shared cache management program 3112 updates the cache management table 3122 with respect to the area in which the swapped out data had been stored (the write-destination area of the migration-target data) (S709). Specifically, for example, the page number 31211 for the relevant area is changed from the page number of the swapped out data to the page number of the migration-target data. In this example, the size of the swapped out data (decided data) matches the size of the migration-target data, and as such, the updating of the used capacity 31214 as in S707 need not be performed. The size of the swapped out data (the decided data) may also be larger than the migration-target data.

In a case where the migration-target data is stored in either the local extended cache area 3141 or the shared cache area 3142 (S705: Yes), the shared cache management program 3112 determines whether the location in which the migration-target data and the redundant data are being stored is the local extended cache area 3141 or the shared cache area 3142 (S710).

In a case where the determination of S710 is that the redundant data is stored in the local extended cache area 3141, the shared cache management program 3112 references the configuration management table 3121 and determines whether or not the capacity 31213 of the shared cache area 3142 is equal to or larger than the sum of the used capacity 31214 and the redundant capacity (the size of the redundant data) (S711).

In a case where the capacity 31213 is equal to or larger than the sum of the used capacity 31214 and the redundant capacity (S711: Yes), the shared cache management program 3112 writes the redundant data to the shared cache area 3142, and adds the size of the redundant data to the used capacity 31214 of the shared cache area in the configuration management table 2131 (S712).

In a case where the capacity 31213 is less than the sum of the used capacity 31214 and the redundant capacity (S711: No), the shared cache management program 3112 decides the data to be swapped out of the shared cache area 3142 (for example, makes a decision based on the LRU algorithm), and stores the decided data in the storage device 34. The shared cache management program 3112 writes the redundant data to the free area of the shared cache area 3142 (the area in which the swapped out data had been stored) (S713). In addition, the shared cache management program 3112 deletes this redundant data from the local extended cache area 3141 (S714). Thereafter, the shared cache management program 3112 performs the processing of S709. The size of the data decided in S713 matches the size of the redundant data, but may be larger than the size of the redundant data.

In a case where the determination of S710 is that the redundant data is stored in the shared cache area 3142, the shared cache management program 3112 ends the processing.

Figure 18:
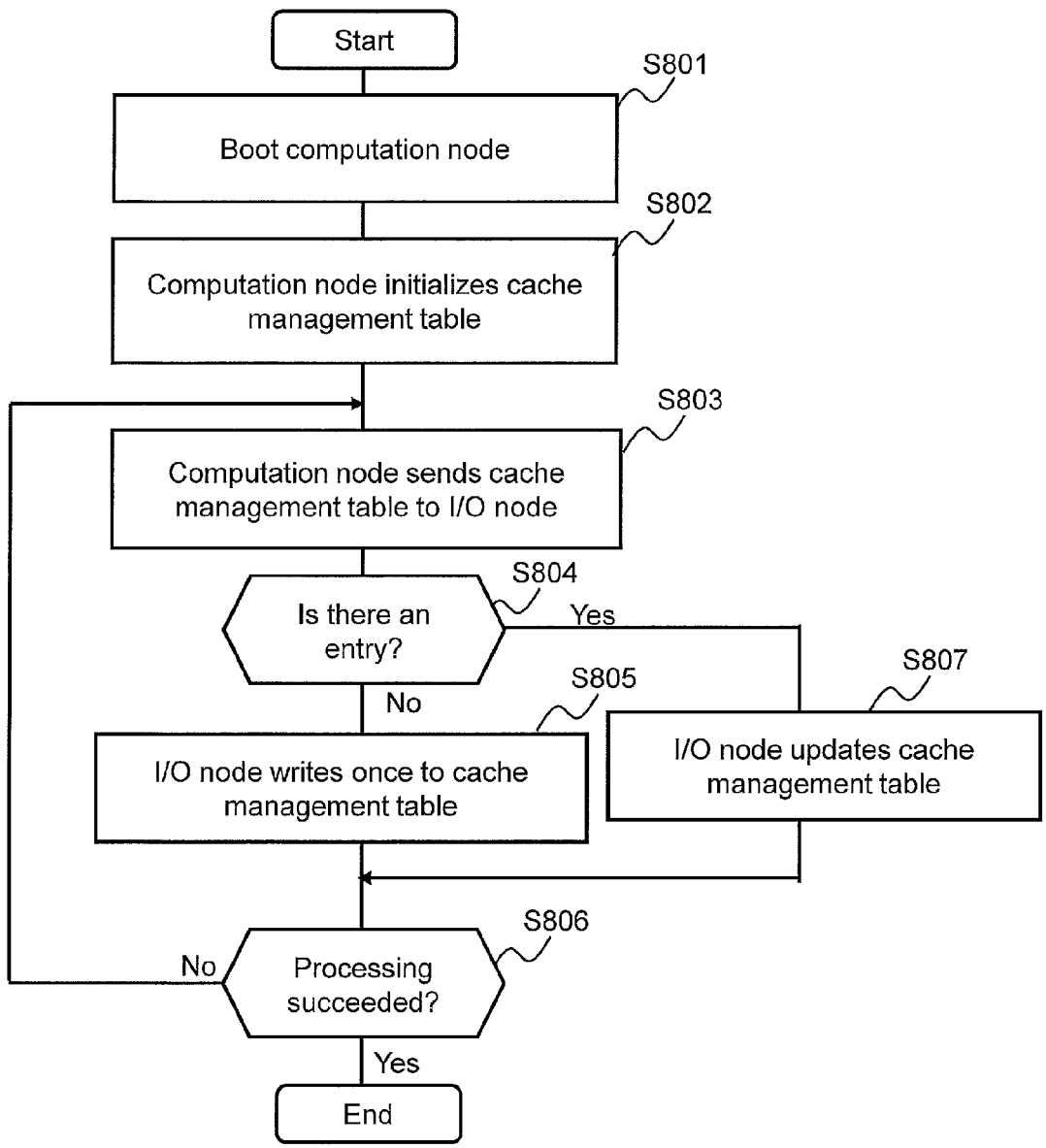
FIG. 18 is an example of a flowchart showing the flow of processing of the computation node 2 boot-up.

FIG. 18 is an example of a flowchart showing the flow of processing of the computation node 2 boot-up process.

When the computation node 2 is powered up (S801), the computation node 2 (the configuration information collection program 2111) executes an initialization process to delete all the data being managed in the cache management table 2122 (S802), and sends the configuration management table 2121 and the cache management table 2122 to the I/O node 3 (S803).

The I/O node 3 (the configuration information collection program 3111) receives the configuration management table 2121 and the cache management table 2122 from the computation node 2, and determines whether information based on these tables 2121 and 2122 is already registered in the address management table 3123 (S804).

In a case where this information is not registered (S804: No), the I/O node 3 (the configuration information collection program 3111) references the unregistered configuration management table 2121 of the computation node 2, creates the same number of virtual addresses 31231 as there are physical addresses 21213, and registers the virtual addresses 31231 in the address management table 3123 (S805). This processing associates the virtual local cache area 3143 of the I/O node 3 with the local cache area 214 of the computation node 2. Thereafter, the I/O node 3 determines whether or not this processing was a success (S806).

In a case where the processing was a success (S806: Yes), the I/O node 3 ends the processing. Alternatively, in a case where the processing failed (S806: No), the I/O node 3 performs the processing of S803.

In a case where the determination of S804 is that the information is registered (S804: Yes), the I/O node 3 configures the utilization statuses 31235 of all the computation nodes 2 corresponding to the address management table 3123 to unused (S807). Thereafter, the I/O node 3 performs the processing of S806.

Figure 19:
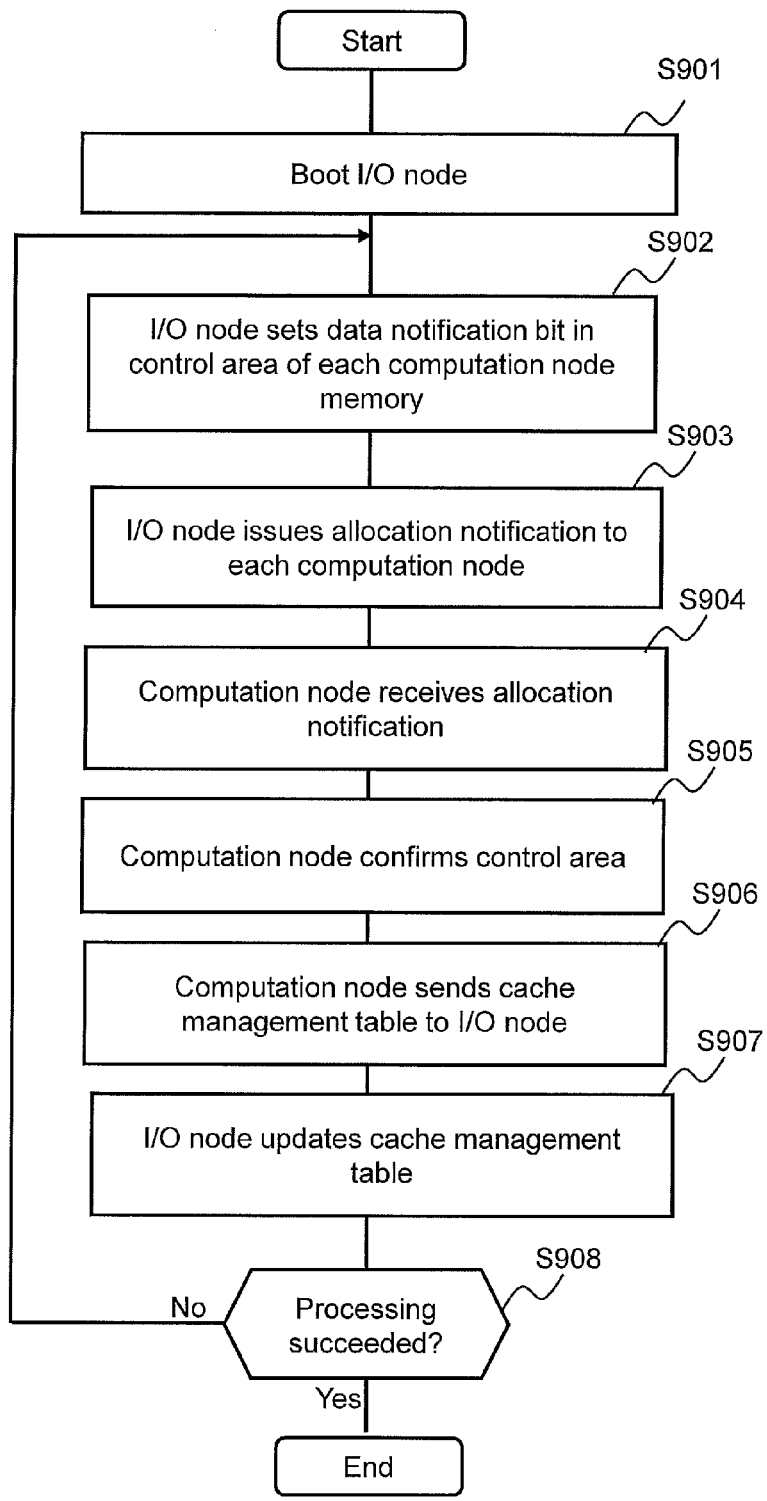
FIG. 19 is an example of a flowchart showing the flow of processing of an I/O node 3 boot-up.

FIG. 19 is an example of a flowchart showing the flow of processing an I/O node 3 boot-up process.

When the I/O node 3 is powered up (S901), the I/O node 3 (the configuration information collection program 3111) uses the RDMA function, sets a data notification bit in the control command storage area 215 of each computation node 2 memory (S902), and sends an interrupt notification to each computation node 2 (S903).

The computation node 2 (the configuration information collection program 2111) receives the interrupt notification from the I/O node 3 (S904), checks that a data notification bit is stored in the control command storage area 215 of the memory 21 (S905), and sends the cache management table 2122 information held by this computation node 2 to the I/O node 3 (S906).

The I/O node 3 receives the cache management table 2122 information from the computation node 2, and registers information based on this information in the cache management table 3122 (S907). The I/O node 3 determines whether or not the processing of S907 was a success (S908).

In a case where the processing was a success (S908: Yes), the I/O node 3 ends the processing. Alternatively, in a case where the processing failed (S908: No), the I/O node 3 performs the processing of S902.

According to Example 1, in a computer system 1 in which an I/O node 3 is coupled to multiple computation nodes 2, it is possible to share data in a cache area without duplicating this data.

In addition, Example 1 also makes it possible to share frequently used data in a cache area between computation nodes 2 by forming a cache area (a shared cache area), which stores data referenced by multiple computation nodes 2. Therefore, Example 1 makes it possible to enhance the processing performance of an application program running on the computation node 2 without increasing the capacity of the cache area of each computation node 2, and, in addition, also enables I/O requests from multiple computation nodes to be concentrated in the local cache area of a computation node to avoid the deterioration of application program processing performance.

EXAMPLE 2

Example 2 will be explained hereinbelow. In so doing, the differences with Example 1 will mainly be explained, and explanations of points in common with Example 1 will either be simplified or omitted.

In Example 2, in a case where there is an I/O request from the application program 4, each computation node 2 determines whether or not the request data is stored in the local cache area 214 of the computation node 2, and in a case where the data is being stored, returns the stored data to the application program 4 without sending the I/O request to the I/O node 3.

Figure 20:
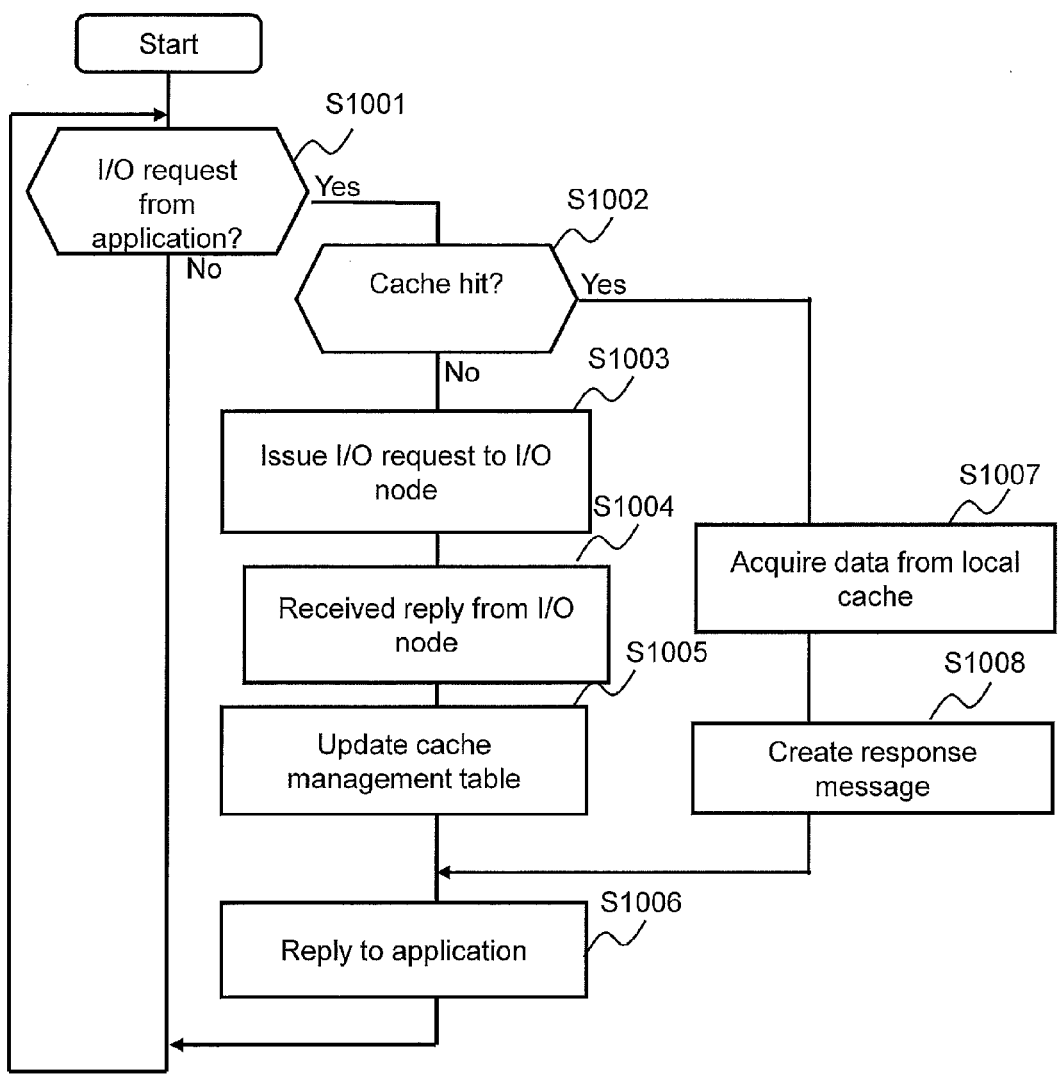
FIG. 20 is an example of a flowchart showing the flow of processing of a cache management program 2113 related to Example 2.

FIG. 20 is an example of a flowchart showing the flow of processing of a cache management program 2113 related to Example 2.

The cache management program 2113 determines whether or not there is an I/O request from the application program 4 (S1001).

In a case where there is no I/O request (S1001: No), the cache management program 2113 performs the processing of S1001.

Alternatively, in a case where there is an I/O request (S1001: Yes), the cache management program 2113 references the cache management table 2122, and determines whether the requested data is stored in the local cache area 214 (S1002).

In a case where the requested data is not being stored in the local cache area 214 (S1002: No), the cache management program 2113 performs the same processing as the processing of S302 through S305 of FIG. 13 (S1003 through S1006).

Alternatively, in a case where the requested data is stored in the local cache area 214 (S1002: Yes), the cache management program 2113 acquires the data from the local cache area 214 rather than from the cache area 314 of the I/O node 3 (S1007). The cache management program 2113 creates a response message for the application program 4 (S1008). Thereafter, the cache management program 2113 performs the processing of S1006.

EXAMPLE 3

Example 3 will be explained. In so doing, the points of difference with Example 1 and Example 2 will mainly be explained, and explanations of the points in common with Example 1 and Example 2 will either be simplified or omitted.

In Example 3, the computation nodes 2 include a virtual node (a virtual computer) in addition to a physical node. There is no I/O node 3 in Example 3, and in place of the I/O node 3, any virtual node performs the same processing as the I/O node 3.

Figure 21:
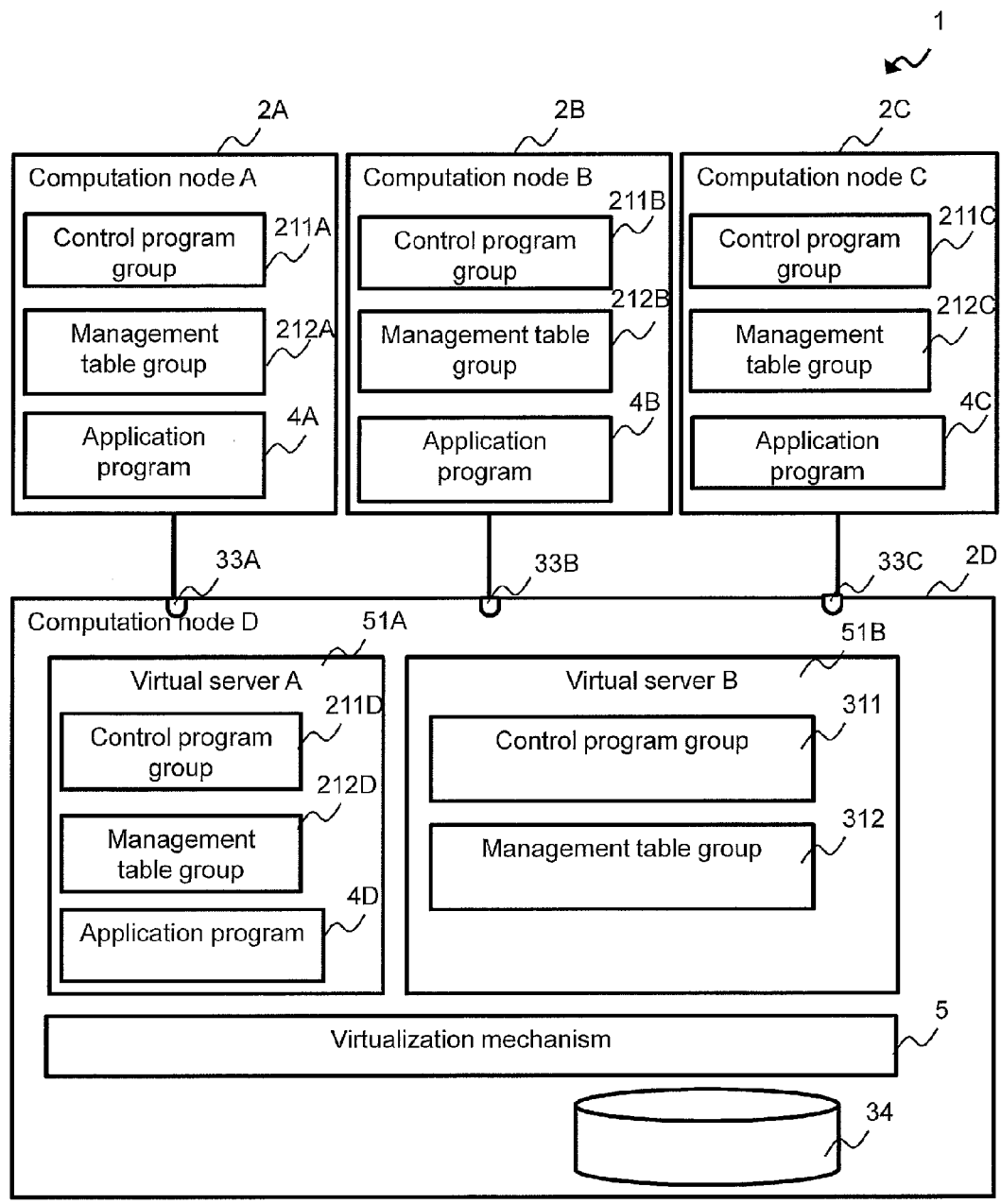
FIG. 21 shows an example of the overall configuration of a computer system 1 related to Example 3.

FIG. 21 shows the overall configuration of a computer system 1 related to Example 3.

There is a computation node 2D, which has a storage device 34. The computation node 2D creates and manages one or more virtual servers 51 by executing a virtualization mechanism 5 (for example, a hypervisor). The virtual servers 51 include a virtual server 51A, which is a virtual computation node 2, and a virtual server 51B, which performs the same processing as the I/O node 3.

The processor 22 executes processing as a computation node by executing the required processing based on a control program group 211D and a management table group 212D, which are stored in a memory area (omitted from the drawing) allocated to the virtual server 51A from within the memory 21. In addition, the processor 22 executes processing as an I/O node by executing the required processing based on a control program group 311 and a management table group 312, which are stored in a memory area (omitted from the drawing) allocated to the virtual server 51B from within the memory 21.

This example employs a configuration, which partitions processing using a virtualization mechanism, but either an OS thread partition or processing partition function may be employed without using the virtualization mechanism.

A number of examples have been explained hereinabove, but the present invention is not limited to these examples.

For example, in the examples described above, in the processing of S603 (refer to FIG. 16) of the computation node 2 cache management part 2113, data was written to an area corresponding to a request source, but a hash value or the like may be used to uniquely decide a computation node 2 for storing data so as not to duplicate data between computation nodes 2.

In the examples described above, the cache data of the local cache area 214, the local extended cache area 3141, and the shared cache area 3142 are updated at the time of a read request from the application program 4. However, the shared cache management program 3112 can comprise a control API, and in accordance with a specification from the application program 4, the control API can fixedly arrange data used by the application program 4 in any of the cache areas, i.e. the local cache area 214, the local extended cache area 3141, and the shared cache area 3142. In accordance with this, the processing of S603, S604, and S605 in the processing of the shared cache management program 3112 are omitted.

In the examples described above, in the shared cache management program 3112 of the I/O node 3, data was migrated from the one computation node 2 (for example, computation node 2A) to the other computation node (for example, computation node 2B) via the I/O node 3 in accordance with a RDMA communication in a case where a cache hit occurred in any virtual local cache 3143, but a direct RDMA communication process may be performed between the computation nodes 2 (for example, computation nodes 2A and 2B) without going through the cache area 314 of the I/O node 3.

In the examples described above, the application program 4 sends an I/O request, which specifies a page number, but an I/O request may be sent using a virtual address specification.

In the examples described above, processing, which specifies the capacity of the local cache area 214, was performed by the configuration information collection program 2111 of the computation node 2, but this processing may be performed by the configuration information collection program 3111 of the I/O node 3.

In the examples described above, one local extended cache area 3141 was formed in the memory 21, but multiple local extended cache areas 3141 may be formed in each computation node.

In the examples described above, the local extended cache area 3141 and the shared cache area 3142 were logically partitioned and managed in the memory 31, but the two areas may be managed as a single area.

In the examples described above, to ensure that data in the local extended cache area 3141 and the shared cache area 3142 was not duplicated, a check was performed to determine whether or not the data being stored in this two cache areas was redundant, but this processing may be omitted.

In the examples described above, the configuration is such that the interfaces 23 and 33 of the computation node 2 and the I/O node 3 are coupled without going through a prescribed apparatus, but, for example, the computation node 2 interface 22 and the I/O node 3 interface 33 can be coupled via a switch. In so doing, for example, in a case where there are multiple computation nodes 2 and I/O nodes 3, when data is to be sent from a certain computation node 2 to a specific I/O node 3, the computation node 2 may send information identifying the I/O node 3 to the switch apparatus at the same time as the I/O request. This makes it possible for the switch to identify a specific computation node 2, and to distribute an I/O request from the computation node 2 to the specific I/O node 3.

The storage device may comprise logical areas, and each logical area may an element comprising a stripe based on a RAID group. Each logical area group may be a component of a logical unit provided to an apparatus, which is the source of a write request (for example, either a host computer or another storage system), or may be an area group (an area group allocated to the write-destination virtual segment corresponding to the write to the virtual segment), which is dynamically allocated to any of multiple virtual segments (virtual storage areas) comprising a virtual logical unit (for example, a logical unit conforming to Thin Provisioning) provided to the write request source apparatus. In the case of the latter, a storage area pool may be configured using multiple logical segments, and may be allocated to the virtual segment in logical segment units. The storage area pool may comprise multiple logical units, and in accordance with this, each logical unit may comprise two or more logical segments.

The swap-out process may be performed at a different time either instead of or in addition to being performed during a series of processes (S504 of FIG. 15) performed after receiving the I/O request.

In this specification, a storage system of the following (Wording 1) and (Wording 2) has been explained.

(Wording 1)

A computer system comprising:

multiple first computers; and a second computer comprising a second storage device, wherein each of the above-mentioned multiple first computers comprises a first application program, a first cache management module, and a first cache area, the above-mentioned second computer comprises a virtualization mechanism, multiple OSs run on the above-mentioned virtualization mechanism, and the above-mentioned multiple OSs comprise an OS for running a second application program, and at least one OS comprising a second cache management module and a second cache management table, the above-mentioned first application program and/or the above-mentioned second application program send(s) an access request to the above-mentioned second cache management module, the above-mentioned second cache management module:

(A) receives the above-mentioned access request from the above-mentioned first application program and/or the above-mentioned second application program;

(B) references the above-mentioned second cache management table to identify a storage location of an access-target data conforming to the above-mentioned access request;

(C) sends a data transfer request to a first cache management module which stores the above-mentioned access-target data in a case where the above-mentioned access-target data exists in the above-mentioned first cache area; and (D) acquires the above-mentioned access-target data from the above-mentioned second storage device in a case where the above-mentioned access-target data does not exist in the above-mentioned first cache area, in the case of the above-mentioned (C), the above-mentioned first cache management module acquires the above-mentioned access-target data conforming to the above-mentioned data transfer request from a relevant first cache area, and sends the above-mentioned access-target data to the above-mentioned second cache management module, and the above-mentioned second cache management module sends the above-mentioned acquired access-target data or the received access-target data to the above-mentioned first application program and/or the above-mentioned second application program, which are/is the source of the above-mentioned access request.

(Wording 2)

A computer system, comprising:

multiple first computers, which each comprise a first cache area; and a second computer, which comprises a second storage device, wherein the above-mentioned second computer comprises a function for managing the above-mentioned first cache areas of the multiple first computers, each of the above-mentioned multiple first computers comprises a first application program, a first cache management module, and a first cache area, the above-mentioned second computer comprises a second cache management module, multiple second cache areas, a third cache area, and a second cache management table, each of the above-mentioned multiple first cache areas is associated with one of the above-mentioned second cache areas, the above-mentioned first cache area and the above-mentioned third cache area are physical cache areas, the above-mentioned second cache area is a virtual cache area, the above-mentioned target first computer is any first computer of the above-mentioned multiple first computers, and a target first application program of the above-mentioned target first computer sends an access request to the above-mentioned second computer via the first cache management module of the above-mentioned target first computer, the above-mentioned second cache management module:

(A) receives the above-mentioned access request from the above-mentioned first application program;

(B) references the above-mentioned second cache management table to identify a storage location of access-target data conforming to the above-mentioned access request; and (C) in a case where the above-mentioned access-target data exists in the above-mentioned second cache area, sends a data transfer request to a relevant first cache management module of the above-mentioned target first computer, which comprises a target first cache area corresponding to the above-mentioned second cache area, the above-mentioned relevant first cache management module acquires the above-mentioned access-target data conforming to the above-mentioned data transfer request from the above-mentioned target first cache area, and sends the above-mentioned access-target data to the above-mentioned second cache management module, and the above-mentioned second cache management module sends the received access-target data to the above-mentioned first application program.

In these wordings, the first application program and the second application program, for example, correspond to application programs 4A through 4D. The OS, for example, corresponds to either the control program group 211A through 211D or the control program group 311. The first cache management module, for example, corresponds to the control program group 211 and the management table group 212 (excluding cache management table 2122), and the second cache management module, for example, corresponds to the control program group 311 and the management table group 312 (excluding the cache management table 3122).

REFERENCE SIGNS LIST

1 Computer system
2 Computation node
3 I/O node

The invention claimed is:

1. A computer system, comprising:

multiple first computers; and a second computer comprising a second storage device, wherein:

each of the multiple first computers comprises a first application program, a first cache management module, and a first cache area, the second computer comprises a virtualization mechanism, multiple operating systems run on the virtualization mechanism, and the multiple operating systems comprise an OS for running a second application program, and at least one operating system comprising a second cache management module and a second cache management table, at least one of the first application program and the second application program sends an access request to the second cache management module, the second cache management module being configured to:

receive the access request from the at least one of the first application program and the second application program;

reference the second cache management table to identify a storage location of access-target data conforming to the access request;

send a request to a first cache management module which stores the access-target data in a case where the access-target data exists in the first cache area; and acquire the access-target data from the second storage device in a case where the access-target data does not exist in the first cache area, in the case of sending the request, the first cache management module is configured to acquire the access-target data conforming to the request from the first cache area, and to send the access-target data to the second cache management module, and the second cache management module is configured to send the acquired access-target data or the received access-target data to the at least one of the first application program and the second application program serving as a source of the access request.

2. A computer system according to claim 1, wherein:

the second computer comprises multiple second cache areas and a third cache area, each of the multiple first cache areas is associated with one of the second cache areas, the second cache management table stores information of the second cache area, the third cache area, and the second storage device, the first cache area and the third cache area are physical cache areas, the second cache area is a virtual cache area, and the second cache management module is configured to determine that a first computer comprises a first cache area that is relevant and which corresponds to a second cache area that is relevant by identifying a second cache area which stores access-target data conforming to the access request.

3. A computer system according to claim 1, wherein:

the first computer further comprises a first cache management table, the second cache management table stores information of the first cache area, the first application program sends an access request to the first cache management module, the first cache management module is configured to reference the first cache management table, and in a case where the access-target data is in the first cache area, acquire the access-target data from the first cache area without sending the access request to the second computer, and in a case where the access-target data is not in a target first cache area, the first cache management module is configured to send the access request to the second computer, acquire the access-target data from the second computer, and send the acquired access-target data to the first application program.

4. A computer system according to claim 1, wherein:

in a case in which the access-target data is in a target first cache area, the first cache management module is configured to send the access request to the second computer, and in referencing the second cache management table to identify the storage location of the access-target data conforming to the access request, in a case where the access target data is in the target first cache area, the second computer is configured to read the access-target data from the target first cache area.

5. A computer system according to claim 1, wherein:

in a case where the access target data is in a target first cache area, the first cache management module is configured such that the first cache management module does not send the access request to the second computer, and in a case where the access target data is not in the target first cache area, the first cache management module is configured to send the access request to the second computer.

6. A cache control method performed by a second computer, which is coupled to multiple first computers and manages a second storage device, wherein:

each of the multiple first computers comprises a first application program, a first cache management module, and a first cache area, the second computer comprises a virtualization mechanism, multiple operating systems run on the virtualization mechanism, and the multiple operating systems comprise an operating system for running a second application program, and at least one operating system comprising a second cache management module and a second cache management table, at least one of the first application program and the second application program sends an access request to the second cache management module, the cache control method comprises performing, by the second cache management module:

receiving the access request from the at least one of the first application program and the second application program;

referencing the second cache management table to identify a storage location of access-target data conforming to the access request;

sending a request to a first cache management module which stores the access-target data, and acquiring the access-target data conforming to the request from the first cache area in a case where the access-target data exists in the first cache area;

acquiring the access-target data from the second storage device in a case where the access-target data does not exist in the first cache area; and sending the acquired access-target data or the received access-target data to the at least one of the first application program and the second application program serving as a source of the access request.

7. A cache control method according to claim 6, wherein the second computer comprises multiple second cache areas and a third cache area, each of the multiple first cache areas is associated with one of the second cache areas, the second cache management table stores information of the second cache area, the third cache area, and the second storage device, the first cache area and the third cache area are physical cache areas, the second cache area is a virtual cache area, and the second cache management module is configured to determine that a first computer comprises a first cache area that is relevant and which corresponds to a second cache area that is relevant by identifying a second cache area which stores access-target data conforming to the access request.

8. A computer readable non-transitory data storage medium containing a computer program having instructions stored therein, the instructions being executable by a processor belonging to a second computer, which is coupled to multiple first computers and which is configured to manage a second storage device, wherein:

each of the multiple first computers comprises a first application program, a first cache management module, and a first cache area, the computer program comprises a virtualization mechanism, multiple operating systems run on the virtualization mechanism, and the multiple operating systems comprise an operating system for running a second application program, and at least one operating system comprising a second cache management module and a second cache management table, the second cache management module being configured to receive an access request sent by at least one of the first application program and the second application program, the executable instructions causing the second cache management module to perform operations comprising:

receiving the access request from at least one of the first application program and the second application program;

referencing the second cache management table to identify a storage location of access-target data conforming to the access request;

sending a request to a first cache management module which stores the access-target data, and acquiring the access-target data conforming to the request from the first cache area in a case where the access-target data exists in the first cache area;

acquiring the access-target data from the second storage device in a case where the access-target data does not exist in the first cache area; and sending the acquired access-target data or the received access-target data to the at least one of the first application program and the second application program, serving as a source of the access request.

* * * * *